US010862534B2

(12) United States Patent
Jeremy et al.

(10) Patent No.: US 10,862,534 B2
(45) Date of Patent: Dec. 8, 2020

(54) TELECOMMUNICATION SYSTEM AND METHOD, AND COMPONENTS THEREFOR

(71) Applicant: R F INDUSTRIES PTY LIMITED, Seven Hills (AU)

(72) Inventors: Alastair Brian Jeremy, Sydney (AU); Christopher John Snell, Sydney (AU)

(73) Assignee: R F INDUSTRIES PTY LIMITED, Seven Hills (AU)

( * ) Notice: Subject to any disclaimer, the term of this patent is extended or adjusted under 35 U.S.C. 154(b) by 0 days.

(21) Appl. No.: 16/336,071

(22) PCT Filed: Sep. 22, 2017

(86) PCT No.: PCT/AU2017/051036
§ 371 (c)(1),
(2) Date: Mar. 22, 2019

(87) PCT Pub. No.: WO2018/053596
PCT Pub. Date: Mar. 29, 2018

(65) Prior Publication Data
US 2019/0229768 A1 Jul. 25, 2019

(30) Foreign Application Priority Data

Sep. 25, 2016 (AU) .................................. 2016903881

(51) Int. Cl.
*H04B 3/50* (2006.01)
*H04L 12/10* (2006.01)
(Continued)

(52) U.S. Cl.
CPC .................. *H04B 3/50* (2013.01); *H04B 3/36* (2013.01); *H04B 3/44* (2013.01); *H04B 3/548* (2013.01);
(Continued)

(58) Field of Classification Search
CPC ... H04B 3/36; H04B 3/44; H04B 3/50; H04B 3/548; H04B 3/58; H04L 69/08
See application file for complete search history.

(56) References Cited

U.S. PATENT DOCUMENTS

2007/0278857 A1  12/2007  Robbins
2011/0163605 A1   7/2011  Ronen et al.
(Continued)

FOREIGN PATENT DOCUMENTS

WO     2018/053596 A1     3/2008

OTHER PUBLICATIONS

IPCamPower, User Guide for IPCP-EXT2P PoE Extender. (Year: 2015).*

(Continued)

*Primary Examiner* — David S Huang
(74) *Attorney, Agent, or Firm* — Socal IP Law Group LLP; Angelo J. Gaz

(57) ABSTRACT

Disclosed is an electrical module adapted to operatively connect to a transmission line. The electrical module includes a connection point adapted to connect to a network device. The electrical module is configured to receive a composite signal from the transmission line, the composite signal including a data component and a power component, and to separate the composite signal to extract the data component and the power component. The electrical module is further configured to transmit data to the network device through the connection point, and to supply power to the network device through the connection point. Also disclosed is a telecommunication system and method.

3 Claims, 16 Drawing Sheets

(51) Int. Cl.
  *H04L 29/06* (2006.01)
  *H04B 3/36* (2006.01)
  *H04B 3/44* (2006.01)
  *H04B 3/56* (2006.01)
  *H04B 3/54* (2006.01)
  *H04B 3/58* (2006.01)
  *H04M 11/00* (2006.01)

(52) U.S. Cl.
  CPC .............. *H04B 3/56* (2013.01); *H04B 3/58* (2013.01); *H04L 12/10* (2013.01); *H04L 69/08* (2013.01); *H04M 11/00* (2013.01)

(56) References Cited

U.S. PATENT DOCUMENTS

2013/0004155 A1\* 1/2013 Liang ................ H04Q 11/0067
                                                            398/9
2014/0348160 A1    11/2014 Robitaille et al.

OTHER PUBLICATIONS

Veracity, "Highwire Powerstar Duo Datasheet", Aug. 2016, https://www.veracityglobal.com/products/ethernet-over-coax-devices/highwire-powerstar-duo.aspx, accessed on May 22, 2020, confirmed availability as early as Aug. 2016 via WebArchive (Year: 2016).\*

Australian Patent Office/ISA, International Search Report for PCT Application No. PCT/AU2017/051036, dated Dec. 13, 2017.

Australian Patent Office/ISA, Written Opinion of the International Searching Authority for PCT Application No. PCT/AU2017/051036, dated Dec. 13, 2017.

Australian Patent Office/IPEA, Notification of Transmittal of International Preliminary Report on Patentability for PCT Application No. PCT/AU2017/051036, dated May 9, 2018.

\* cited by examiner

TELECOMMUNICATION SYSTEM AND METHOD, AND COMPONENTS THEREFOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the patent and trademark office patent files or records, but otherwise reserves all copyright and trade dress rights whatsoever.

RELATED APPLICATION INFORMATION

This application claims priority to International PCT Application No. PCT/AU2017/051036, with an international filing date of Sep. 22, 2017, entitled "TELECOMMUNICATION SYSTEM AND METHOD, AND COMPONENTS THEREFOR," which claims priority to Australian Patent Application No.: 2016903881 filed Sep. 25, 2016, the disclosures and figures of which are incorporated by reference as if set forth herein in their entirety.

TECHNICAL FIELD

The present invention relates to a telecommunication system and method, and in particular, to components therefor, which facilitate transmission of both data and power along a transmission line.

BACKGROUND

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

Industrial environments with a linear topology often require network devices to be deployed along their length for the purposes of video surveillance, monitoring of personnel, monitoring of assets, data communication, data transfer, data acquisition and control systems. Examples of industrial environments involving a linear topology include, without limitation, underground mines, road tunnels, rail tunnels, pedestrian tunnels, conveyor belts, and processing lines in factories. Examples of network devices that may be deployed in these environments include, without limitation, video cameras, electronic signs, wireless network base stations, environmental sensors, and actuators. These network devices would commonly use Ethernet communication interfaces, and may in some cases be able to be optionally powered according to the Power over Ethernet specification.

A large range of industrial network devices are available to implement the required video surveillance, monitoring and control functions. However, these network devices require power and a backhaul network data connection in order to operate.

The provision of power and a backhaul network data connection is challenging in industrial linear environments for a number of reasons, including that AC power outlets are not readily available; distances are large, and the required spacing between network devices often exceeds 100 m (which is a convenient distance for conventional Ethernet networking technology options); and that the environment is dynamic and constantly changing, meaning that the network must be able to be repeatedly modified or extended with ease.

One existing attempt to solve this requirement has been the use of fibre optic links. This solution consists of installing fibre optic cables and power distribution between each location that requires a network device. At each of those locations an expensive cabinet is installed, which contains fibre optic break-outs, a network switch, and DC power conversion equipment.

Drawbacks of the fibre optic link solution are that it is expensive, requires specialised skills, and is not suited to a dynamic environment due to the difficulty in changing the network topology in-situ.

Another existing attempt to solve this requirement has been the use of a cable modem system. The cable modem system solution consists of installing a Cable Modem Termination System (CMTS) at the beginning of the linear topology and then distributing high capacity coaxial cable between each location. At each of those locations a splitter is installed to tap the data signal off the cable via a cable modem, with a cabinet still being required to power the network devices and optionally to house network switches when multiple network devices are present at that location.

Drawbacks of the Cable Modem System solution are that power needs to be separately distributed to each location to power the endpoint network devices, the complexity of managing a Cable Modem Termination System (CMTS) and the fact that data backhaul performance degrades as more network devices are added and the cable length increases.

A third existing attempt to solve this requirement is with a leaky feeder radio system. The leaky feeder solution involves 'piggy-backing' off the 'leaky feeder radio systems' that are commonly deployed in industrial tunnel environments. The leaky feeder systems consist of a coaxial cable that 'leaks' radio signals along the length of the cable through regularly placed small holes in the cable shielding, primarily for the purpose of voice communications. It is possible to use radio modems to communicate data over such a network, however Leaky Feeder radio systems are used primarily for voice communications. At each location that requires a network device, a radio modem is installed, with a cabinet still being required to provide power to the endpoint network device.

Drawbacks of the Leaky Feeder radio solution are that power needs to be distributed to each location to power the endpoint network devices independently of the network communication cabling, and the data rates are low (generally less than 1 Mbps). Low data rates such as these are unable to satisfy the data communication requirements of many network devices that would be desirable to deploy in these environments, such as network video cameras.

While the above solutions have enabled some connectivity to be achieved in linear industrial environments, their limitations have meant that the desired range of video surveillance, monitoring and control devices are unable to be deployed.

In summary, distributing power to and backhauling high speed data from Ethernet network devices along the length of a linear industrial environment is not commercially practical using a single two conductor cable.

In industrial environments involving long linear communication segments, there is potential for interference and/or ground loops that cause problems when attempting high speed communication or distribution of power along the length of the linear segments. Such problems make it difficult to reliably achieve high speed communication, and the ground loops can cause high fault current to flow, damaging or destroying sensitive equipment.

There is a need for new or improved telecommunication systems and methods, and for new or improved components for use in or with the telecommunication systems.

SUMMARY

The present invention seeks to overcome at least some of the disadvantages of the prior art, by providing a telecommunication system/method whereby power and data can be transmitted via a single transmission line. The present invention also seeks to provide telecommunication components for use in the system/method, to facilitate the transmission of power and data via a single transmission line.

This Summary is provided to introduce a selection of concepts in a simplified form that are further described below in the Preferred Embodiments. This Summary is not intended to identify key features or essential features of the claimed subject matter, nor is it intended to be used to limit the scope of the claimed subject matter.

According to one example aspect, there is provided an electrical module adapted to operatively connect to a transmission line, the electrical module including: a connection point adapted to connect to a network device; wherein the electrical module is configured to: receive a composite signal from the transmission line, the composite signal including a data component and a power component; separate the composite signal to extract the data component and the power component; transmit data to the network device through the connection point; and supply power to the network device through the connection point.

According to another example aspect, there is provided a repeater module adapted to operatively connect to a first transmission line and to a second transmission line, wherein the repeater module is configured to: receive a composite signal from the first transmission line, the composite signal including a data component; receive a signal from the first transmission line or from the second transmission line, the signal including a power component; separate the composite signal to extract the data component; separate the signal to extract the power component; decode data and recreate the data to form a recreated data component; and transmit the recreated data component along the second transmission line.

According to another example aspect, there is provided a repeater module adapted to operatively connect to a first transmission line and to a second transmission line, wherein the repeater module is configured to: receive a composite signal from the first transmission line, the composite signal including a data component; receive a signal from the first transmission line or from the second transmission line, the signal including a power component; separate the composite signal to extract the data component; separate the signal to extract the power component; decode data and recreate the data to form a recreated data component; combine a portion of the power component and the recreated data component to generate a recreated composite signal; and transmit the recreated composite signal along the second transmission line.

According to another example aspect, there is provided a repeater module adapted to operatively connect to a first transmission line and to a second transmission line, the repeater module including: a power input port configured to receive an input power; wherein the repeater module is configured to: receive a composite signal from the first transmission line, the composite signal including a data component; separate the composite signal to extract the data component; decode data and recreate the data to form a recreated data component; combine a portion of the input power and the recreated data component to generate a recreated composite signal; and transmit the recreated composite signal along the second transmission line.

According to another example aspect, there is provided a portal module adapted to operatively connect to a transmission line, the portal module including: a power input port configured to receive an input power; and a data port configured to receive input data; wherein the portal node is configured to: combine the input power and the input data to generate a composite signal; and transmit the composite signal along the transmission line.

According to another example aspect, there is provided a telecommunication system including: a transmission line; an electrical module operatively connected to the transmission line, the electrical module including a connection point; and a network device connected to the connection point; wherein the electrical module is configured to: receive a composite signal from the transmission line, the composite signal including a data component and a power component; separate the composite signal to extract the data component and the power component; transmit data to the network device through the connection point; and supply power to the network device through the connection point.

According to another example aspect, there is provided a telecommunication system including: a transmission line adapted to transport data and power; a plurality of network devices operatively attached to the transmission line via a module, wherein the module is: an electrical module as described above; and/or a repeater module as described above.

According to another example aspect, there is provided a telecommunication system including: a transmission line; and three or more modules operatively connected to the transmission line, each module including a connection point adapted to connect to a network device; wherein each module is configured to: receive a composite signal from the transmission line, the composite signal including a data component and a power component; separate the composite signal to extract the data component and the power component; transmit data through the connection point; and supply power through the connection point; wherein a first module of the three or more modules is further configured to: receive output data through the connection point of the first module; and transmit the output data along the transmission line; wherein a second module of the three or more modules is further configured to: receive a second composite signal from the transmission line, the second composite signal including the output data; separate the second composite signal to extract the output data; and transmit data through the connection point of the second module, wherein the data is derived from the output data.

According to another example aspect, there is provided a method of data communication, including the steps of: receiving, by an electrical module, a composite signal including a data component and a power component; separating the composite signal to extract the data component and the power component; transmitting data to a network device connected to the electrical module; and supplying power to the network device.

In some examples, the telecommunications system seeks to solve the technical problem by transmitting sufficient power to operate the communications system and the connected network devices down a single coaxial backbone cable, which can be readily cut, spliced and adapted to the topology of the environment with simple tools, while still backhauling high speed data (up to multiple hundreds of Megabits per second) from the connected network devices.

BRIEF DESCRIPTION OF FIGURES

Example embodiments are apparent from the following description, which is given by way of example only, of at least one preferred but non-limiting embodiment, described in connection with the accompanying figures, wherein.

PREFERRED EMBODIMENTS

Figure 1:
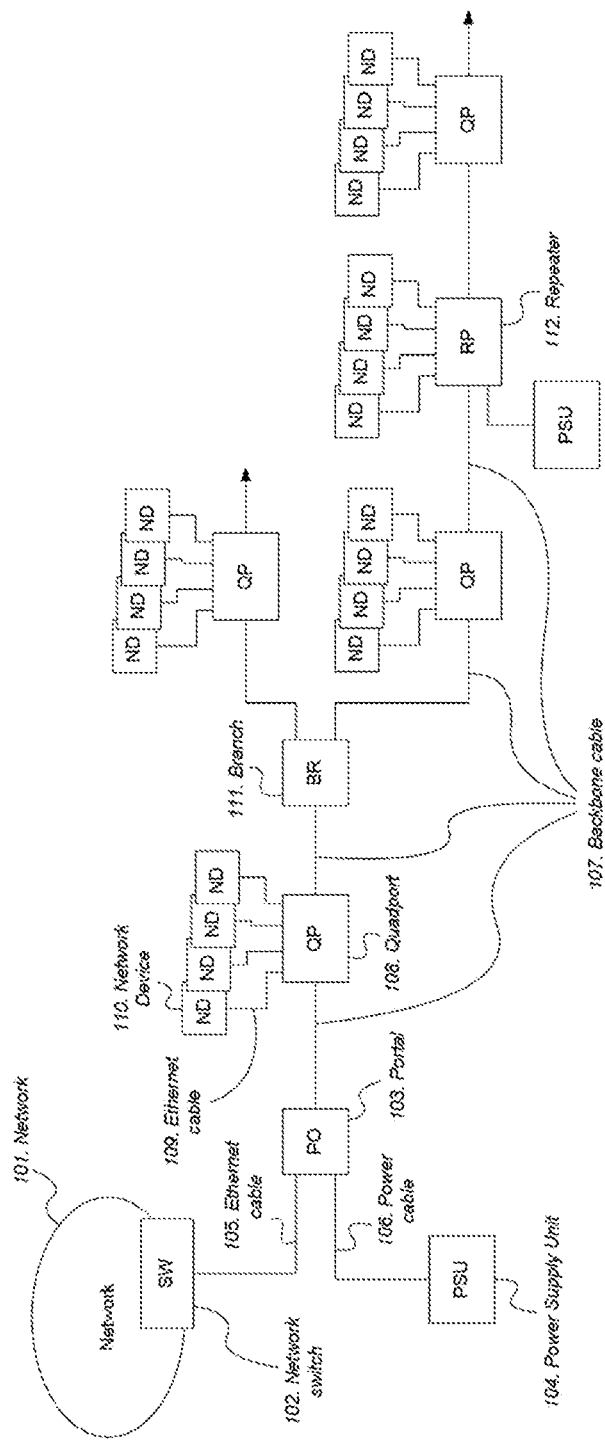
FIG. 1 illustrates an example telecommunication system.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

A variety of node types are used to form the system, providing the building blocks to adapt the invention to a variety of different industrial environments. FIG. 1 shows one of the unlimited possible configurations of these nodes. These node types are illustrated in FIG. 1 and they consist of the Quadport 108, Repeater 112, Branch 111 and Portal 103. They are inter-connected by a backbone coaxial cable 107. The Quadport and the Repeater each provide multiple connection points for Network Devices 110 with each connection point supplying power (using Power over Ethernet standards) and backhauling data (using Ethernet standards).

The system integrates into a site's existing network 101 by connecting a Portal 103 to an existing network switch 102 at the edge of the site's network via an Ethernet cable 105. The portal also permits Extra Low Voltage (ELV) power to be inserted onto the backbone cable 107 from a Power Supply Unit (PSU) 104. From the Portal, the backbone cable can be deployed in a linear path until the first point where a network device 110 is required.

At locations where network devices 110 are required to be deployed, the backbone cable 107 can be cut and a Quadport 108 inserted inline with the backbone cable. The Quadport is powered from the backbone cable, enabling it to connect multiple network devices into the network backbone (using Ethernet cable 109). The Quadport provides the high speed data backhaul connection for each connected network device, and optionally conditions and supplies the power to the network devices using Power over Ethernet standards.

The backbone cable 107 can be continued along the environment's linear topology, inserting Quadports 108 where required until either: the cable's resistive losses make it unable to power any more network devices 110, or the data backhaul speeds degrade to a rate that is unacceptable. This distance is typically between 1 km and 2 km with the exact distance dependent on the number of network devices, their current consumption and the resistive loss of the backbone cable.

At this point a Repeater 112 is inserted inline with the backbone cable, which: re-injects ELV power from a Power Supply Unit and digitally decodes and re-transmits the backbone data signal. The decoding and retransmission operates in a bidirectional manner so that data from the Downstream backbone cable 502 can be retransmitted along the Upstream backbone cable 501, and also data from the Upstream backbone cable 501 can be retransmitted along the Downstream backbone cable 502. This enables another 1 km to 2 km backbone cable segment to continue before another Repeater node is required to be inserted inline.

Similarly to a Quadport node, the Repeater node enables multiple network devices to be connected into the backbone as the Repeater and provides the high speed data backhaul connection for each connected network device, and optionally supplies the power to these network devices using Power over Ethernet standards.

There are locations in linear industrial environments where the network must split in several directions. At these places the backbone coaxial cable has a Branch 111 inserted inline, which allows multiple backbone cables 107 to exit from it with each backbone cable taking a different path.

Using the node types of the Portal 103, Quadport 108, Repeater 112 and Branch 111 with a coaxial backbone cable 107 interconnecting them, the vast range of commonly available industrial network devices 110 can be effectively deployed and supplied with power wherever they are required in industrial environments that have a linear topology. The functional blocks within each node are explained below.

Figure 2:
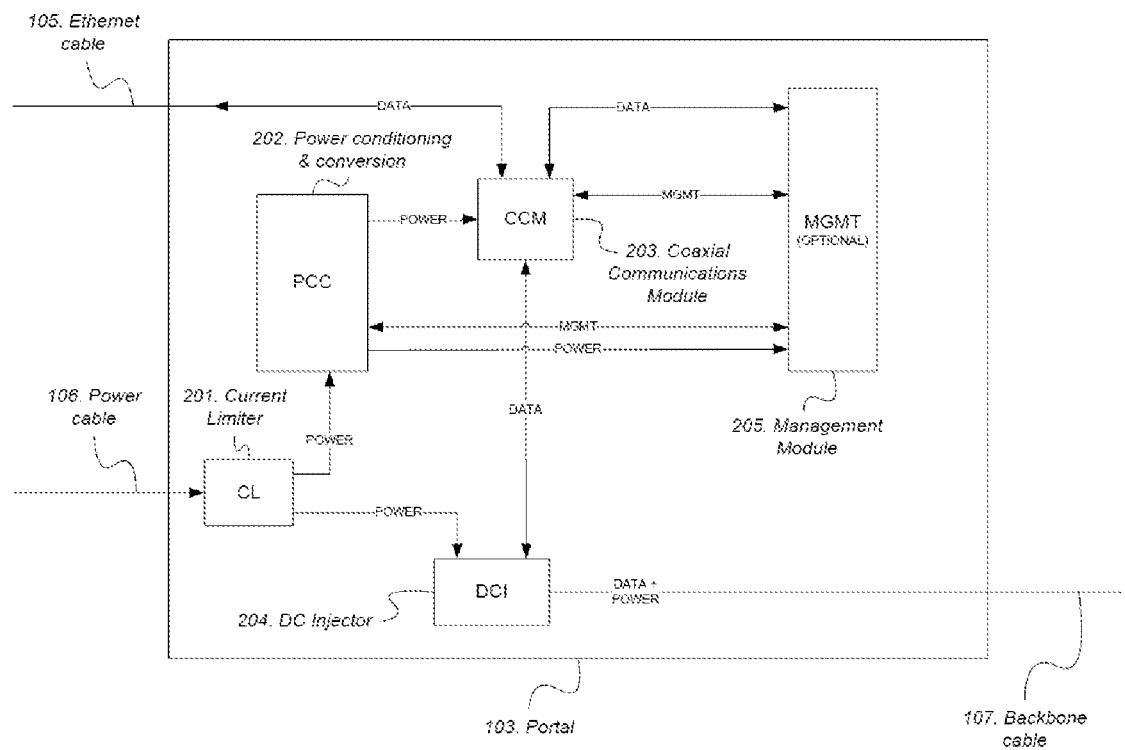
FIG. 2 illustrates a functional block diagram of an example portal module.

The functional block diagram of the Portal 103 is illustrated in FIG. 2. The Portal accepts ELV power via a power cable 106, which internally connects to the current limiter 201. The current limiter ensures that a short circuit or over current event on the node's outgoing backbone cable 107 does not damage the electronics and stops an overheating or fire scenario from arising.

The current limited power is passed to the Power Conditioning and Conversion (PCC) module 202 and the DC injector 204. The PCC module conditions and converts the incoming power to the formats required by the Coaxial Communications Module (CCM) 203 and the management module 205.

The CCM accepts an external network connection via an Ethernet cable 105, which is used as an uplink to the site's existing network. The CCM converts the data packets between Ethernet frames and a format that is suitable for transmission on the backbone cable 107.

The CCM also provides a data connection for the optional management module 205, which, if included, enables the remote monitoring and configuration capabilities of the device.

The DC injector 204 combines the data signaling from the CCM 203 with the power from the current limiter 201 before placing the combination onto the backbone cable 107. The management module 205 provides local and remote monitoring of the PCC module 202 and the CCM 203.

The management module 205 allows a system administrator to be able to set the configuration of the PCC and CCM either locally or remotely. The management module 205 also allows the Portal to be discovered on the network when its network address is unknown and its position in the linear topology needs to be remotely determined.

Therefore, FIG. 2 illustrates an example portal module adapted to operatively connect to a transmission line. The portal module includes a power input port configured to receive an input power, and a data port configured to receive input data. The portal module is configured to combine the input power and the input data to generate a composite signal, and to transmit the composite signal along the transmission line.

Preferably, though not necessarily, the data port is further adapted to connect to an external network through the data port. In some examples, the external network is an Ethernet network. In other examples, the external network may be any other network, such as a LAN network or a fibre-optic network.

In some examples, the portal module is further configured to receive output data from the transmission line. The portal module may further be configured to transmit the output data to the external network. The output data may be transmitted to the external network through the data port, in which case the data port is a bidirectional data port, or alternatively, through any other data port that may optionally be included in the portal module. In this way, the portal node may allow for communication (or transfer of data) between an external network and a communications system (or network) connected to the transmission line, and vice versa.

In some examples, the portal module may be configured to convert a format of the input data and/or output data to be suitable for transmission to the external network or along the transmission line, as appropriate.

In some examples, the portal module is further configured to be remotely monitored. In some examples, the portal module is further configured to be remotely configurable, or programmable, for configuring internal settings of the repeater module. To this end, the portal module may include a management module. In some examples, these functions may be performed locally. In some examples, the portal module further includes a configuration port, which may be connected to the management module, for monitoring, performing diagnostics tests, configuring, or programming the portal module. The configuration port may be one of a USB port or a serial port, or any other type of port.

In some examples, the portal module is further configured to condition the input power. The input power may be provided by any power source, such as a mains power system, a generator, or a battery. The portal module may condition, convert, or adjust the input power from the power source to be suitable for use with network devices and modules connected to the transmission line. For example, the portal module may condition the input power to correspond to DC power, or to correspond to extra-low voltage (ELV) power.

In some examples, the portal module is further configured to power internal circuitry of the portal module using a portion of the input power. The portal module may condition the portion of the input power accordingly. Examples of internal circuitry of the portal module include the CL, PCC, CCM, MGMT, and DCI, as well as any other circuitry necessary for operation of the portal module. Therefore, in some examples, the portal module is configured to power itself, as well as to transmit power along the transmission line (as part of the composite signal) for powering of other devices or modules connected to the communications system.

In some examples, the portal module may further include an output port configured to operatively connect to the transmission line, for example, by connecting to one end of the transmission line. The output port may further be configured to transmit the composite signal along the transmission line. The output port may also be configured to receive output data from the transmission line. Therefore, the output port may be a bidirectional port.

Figure 3:
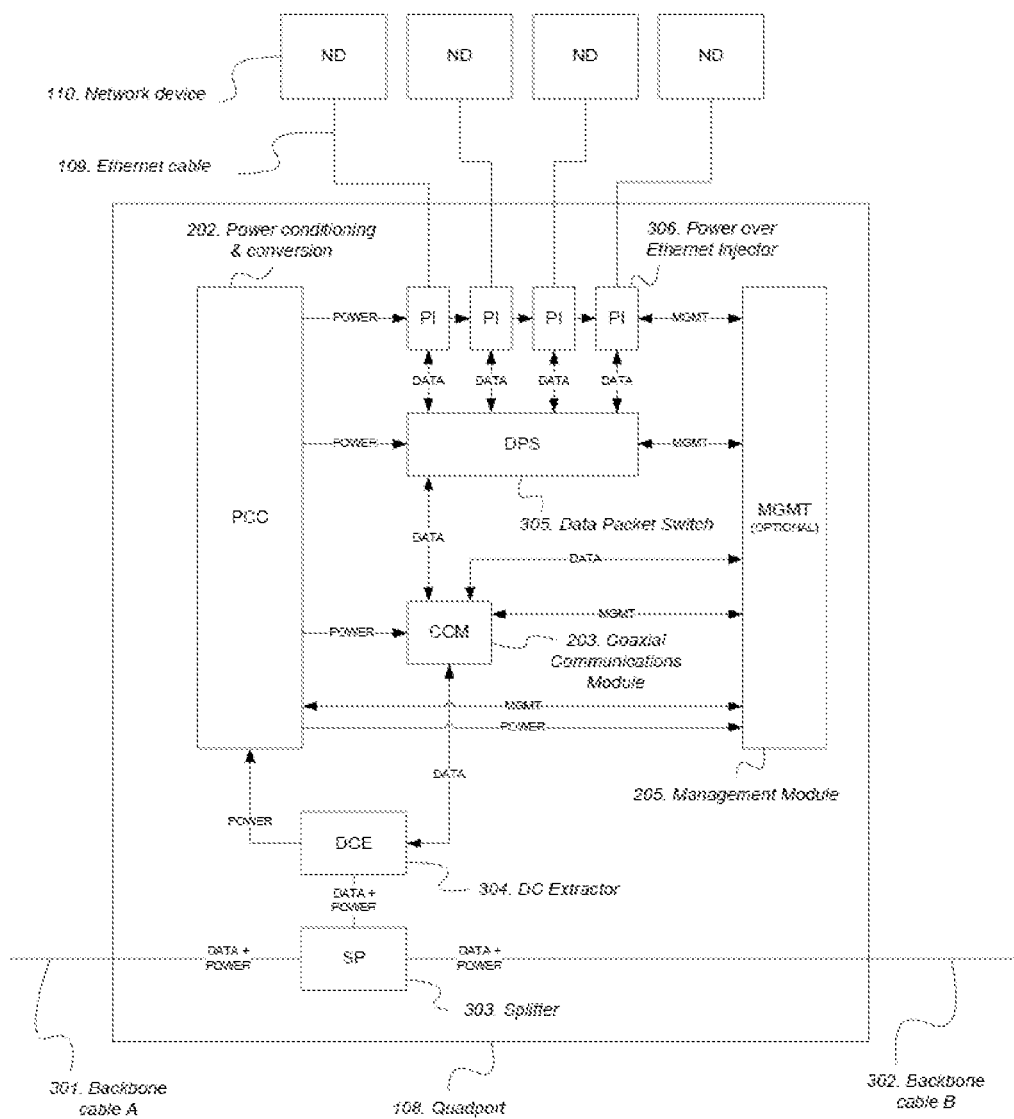
FIG. 3 illustrates a functional block diagram of an example electrical module.

The functional block diagram of the Quadport 108 is illustrated in FIG. 3. The Quadport accepts an incoming backbone cable 301, which carries the data and power signals. This connects to a splitter 303, which has one output leg exiting the Quadport on another backbone cable 302 and the other output leg connected to the internal circuitry, commencing with the DC extractor 304.

The DC extractor splits the power from the data signal, with the power being sent to the Power Conditioning and Conversion (PCC) module 202 and the data signal connected to the Coaxial Communications Module (CCM) 203. The PCC module conditions and converts the incoming power to the formats required by the CCM, the management module 205, the Data Packet Switch (DPS) 305 and the Power over Ethernet Injectors (PI) 306.

The CCM converts data packets between Ethernet frames and a format that is suitable for transmission on the backbone cable 107. The CCM connects to the DPS allowing Ethernet frames to be exchanged.

The DPS provides packet switching to and from the network devices 110 that are connected to the external ports of the Quadport via Ethernet cables 109. The CCM also provides a data connection for the management module 205, which enables the remote monitoring and configuration capabilities of the device.

The Power over Ethernet Injectors (PI) 306 insert power onto the Ethernet cable that connects to each external network device 110. This enables each network device to have a high speed data connection and receive its power over a single Ethernet cable.

The management module 205 provides local and remote monitoring of the PCC module 202, the CCM 203, the DPS 305 and each PI 306. Additionally, the management module allows a system administrator to be able to set the configuration of the PCC, CCM, DPS and PIs either locally or remotely. The management module also allows the Quadport to be discovered on the network when its address is unknown and its position in the linear topology to be remotely determined.

Therefore, FIG. 3 illustrates an example electrical module adapted to operatively connect to a transmission line. The electrical module includes a connection point adapted to connect to a network device. The electrical module is configured to receive a composite signal from the transmission line, the composite signal including a data component and a power component, and to separate the composite signal to extract, or isolate, the data component and the power component. The electrical module is further configured to transmit data to the network device through the connection point, and to supply power to the network device through the connection point.

In some examples, the transmission line is a two-conductor transmission line, such as a ladder line, coaxial cable, stripline, or microstrip. Preferably, though not necessarily, the transmission line is a coaxial cable. In some examples, the coaxial cable is one of a leaky feeder coaxial cable or a hard line coaxial cable.

In some examples, the electrical module includes two or more connection points adapted to connect to two or more network devices. In some examples, the electrical module includes four connection points adapted to connect to four network devices, and is therefore termed a Quadport.

In examples where the electrical module is connected to two or more network devices, the electrical module is configured to transmit data to the two or more network devices through the two or more connection points. Different data signals, frames, or packets may be transmitted to each network device, in which case the electrical module may be configured to switch or route each specific data packet to its corresponding network device. Similarly, the electrical module is further configured to supply power to the two or more network devices through the two or more connection points. Different power signals may be supplied to each network device, in accordance with its power requirements, in which case the electrical module may be configured to condition the power component of the composite signal to produce two or more power signals tailored for the two or more network devices.

In some examples, the connection point is an Ethernet port. In some examples, the electrical module transmits the data to the network device using an Ethernet specification. Furthermore, in some examples, the electrical module supplies the power to the network device using a Power over Ethernet specification, or in a manner compatible with any Power over Ethernet specification. This is advantageous since it allows the electrical module to supply both data and power to the network device through one port (i.e. the connection point) and along one single connection, which may be implemented by an Ethernet cable. In other examples, the electrical module may transmit data to the network device through a first port, and supply power to the network device through a second port.

In some examples, the electrical module is further configured to convert a format of the data. For example, the electrical module may convert a format of the data prior to transmitting it to the network device through the connection point. The electrical module may convert the data to a format suitable for the network device, such as an Ethernet format.

In some examples, the electrical module is further configured to receive output data from the network device. In some examples, the electrical module is further configured to convert a format of the output data, for examples, to a format that is suitable for transmission on the transmission line. In some examples, the electrical module is further configured to transmit the output data along the transmission line. Therefore, the electrical module may be configured to communicate to network devices, or to permit communication between network devices and other network devices or modules connected to the transmission line, by allowing the transfer of data to the network device, and by allowing the transfer of output data from the network device.

In some examples, the electrical module further includes data packet switching circuitry or circuits for routing frames, packets, or signals of the data and/or of the output data between the electrical module and the network device.

In some examples, the electrical module is further configured to be remotely monitored. In some examples, the electrical module is further configured to be remotely configurable, or programmable, for configuring internal settings of the electrical module. To this end, the electrical module may include a management module. In some examples, these functions may be performed locally. In some examples, the electrical module further includes a configuration port, which may be connected to the management module, for monitoring, performing diagnostics tests, configuring, or programming the repeater module. The configuration port may be one of a USB port or a serial port, or any other type of port.

In some examples, the electrical module is further configured to condition the power. For example, the electrical module may condition the power prior to supplying it to the network device through the connection point, in order to satisfy specific power requirements of the network device. In some examples, the electrical module conditions the power to provide a power signal for powering the network device.

In some examples, the electrical module is further configured to power internal circuitry or circuits of the electrical module using a portion of the power component. The electrical module may condition the portion of the power component accordingly. Examples of internal circuitry of the electrical module include the DCE, PCC, CCM, DPS, PI, and MGMT, as well as any other circuit or circuitry necessary for operation of the electrical module. Therefore, in some examples, the electrical module is configured to power itself, as well as to supply power to the network devices through the connection point.

The separation of the composite signal results in the data component being set apart from the power component of the composite signal. In some examples, the electrical module separates the composite signal by filtering the composite signal. In order to separate the composite signal, the electrical module must separate, or demultiplex, the composite signal into its respective data component and power component. In some examples, the data component is a signal, or a plurality or collection of signals, having a frequency which may range from the kilohertz to the megahertz range (or any other frequency). In some examples, the data component is a radio frequency signal, or a collection of radio frequency signals.

In some examples, the data to be transmitted to the network device is derived from the data component of the composite signal. In some examples the data to be transmitted to the network device is the data component of the composite signal. In some examples, the power is derived from the power component of the composite signal. In some examples, the power is the power component of the composite signal.

The data component may include one or more data signals, frames, or packets, addressed to one or more network devices, or to the electrical module itself. For example, the data component may include a first data signal containing operation instructions for the electrical module, and a second data signal containing information for the network device connected to the electrical module.

In some examples, the power component is a DC component (or a low-frequency component) having sufficient electrical power for powering the electrical module and/or network devices connected to the electrical module. In some examples, the power component is a power signal having a frequency of about 50 Hz, or about 60 Hz, or any other frequency to power the network device. Preferably, though not necessarily, the data component has a higher frequency, or is at a higher frequency band, than the power component.

In some examples, the electrical module further includes a filter module for filtering the composite signal. The filter module includes a low-pass filter to extract, or isolate, the power component, and a high-pass filter or a band-pass filter to extract, or isolate, the data component. In other examples, the filter module may include other types of filters, for examples, multiple band-pass filters for extracting, or isolating, multiple data signals within the data component of the composite signal. In some examples, the filter module is a bias tee.

In some examples, the electrical module is adapted to connect to an end of the transmission line. In some examples, as illustrated in FIG. 3, the electrical module further includes a splitter for connecting the electrical module to the end of the transmission line. The splitter includes an input port adapted to connect to the end of the transmission line, a first output port connected to the electrical module, and a second output port. In some examples, the second output port is adapted to connect to an end of a further transmission line. In such examples, the electrical module may receive a composite signal from the transmission line and/or from the further transmission line. Furthermore, the electrical module may be configured to transmit the output data to the transmission line and/or to the further transmission line. To allow for bidirectional signal flow, in some examples, the input port, the first output port, and the second output port of the splitter are bidirectional.

Figure 12:
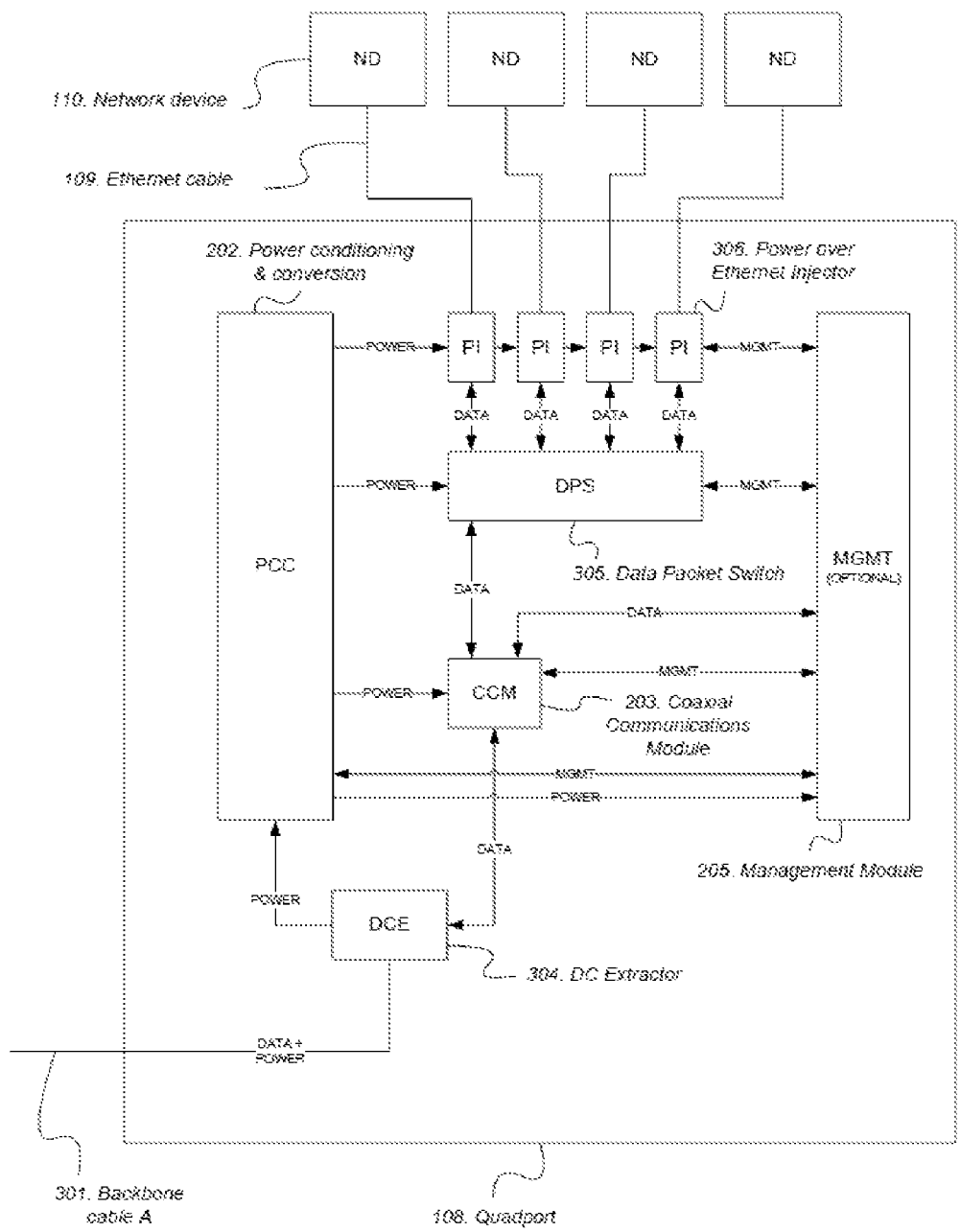
FIG. 12 illustrates a functional block diagram of another example electrical module.

In some examples, as illustrated in FIG. 3, the splitter is provided internally to the electrical module. In other example, as illustrated in FIG. 12, the splitter is provided externally to the electrical module.

In some examples, the electrical module is configured to transmit data to the network device through the connection point, without also supplying power to the network device through the connection point. Therefore, in some examples, the electrical module transfers data from the transmission line to the network device, but it does not supply power from the transmission line to the network device.

In some examples, the network device is a gateway, modem, network switch, or other device to connect to an external network. In some examples, the connection point is a data port adapted to connect to an external network. In some examples, the external network is an Ethernet network. In other examples, the external network may be any other network, such as a LAN network or a fibre-optic network. In some examples, the electrical module is configured to transmit data to the external network through the connection point, and to receive output data from the external network. Therefore, the electrical module may allow for the transfer of data to and from the external network and one or more other network devices or modules of the telecommunication system.

Figure 4:
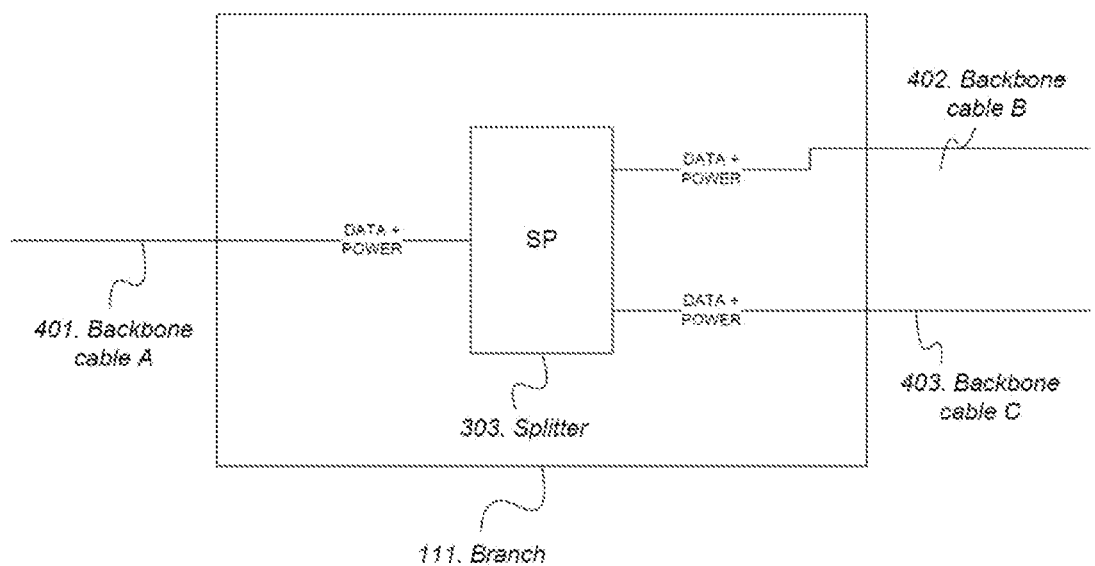
FIG. 4 illustrates a functional block diagram of an example branch module.

The functional block diagram of the Branch is illustrated in FIG. 4. The Branch accepts an incoming backbone cable 401, which carries the data and power signals. This internally connects to a splitter 303, which has multiple output legs with each output leg also carrying the data and power signals. These multiple output legs of the splitter exit the device on the outgoing backbone cables 402 and 403.

Figure 5:
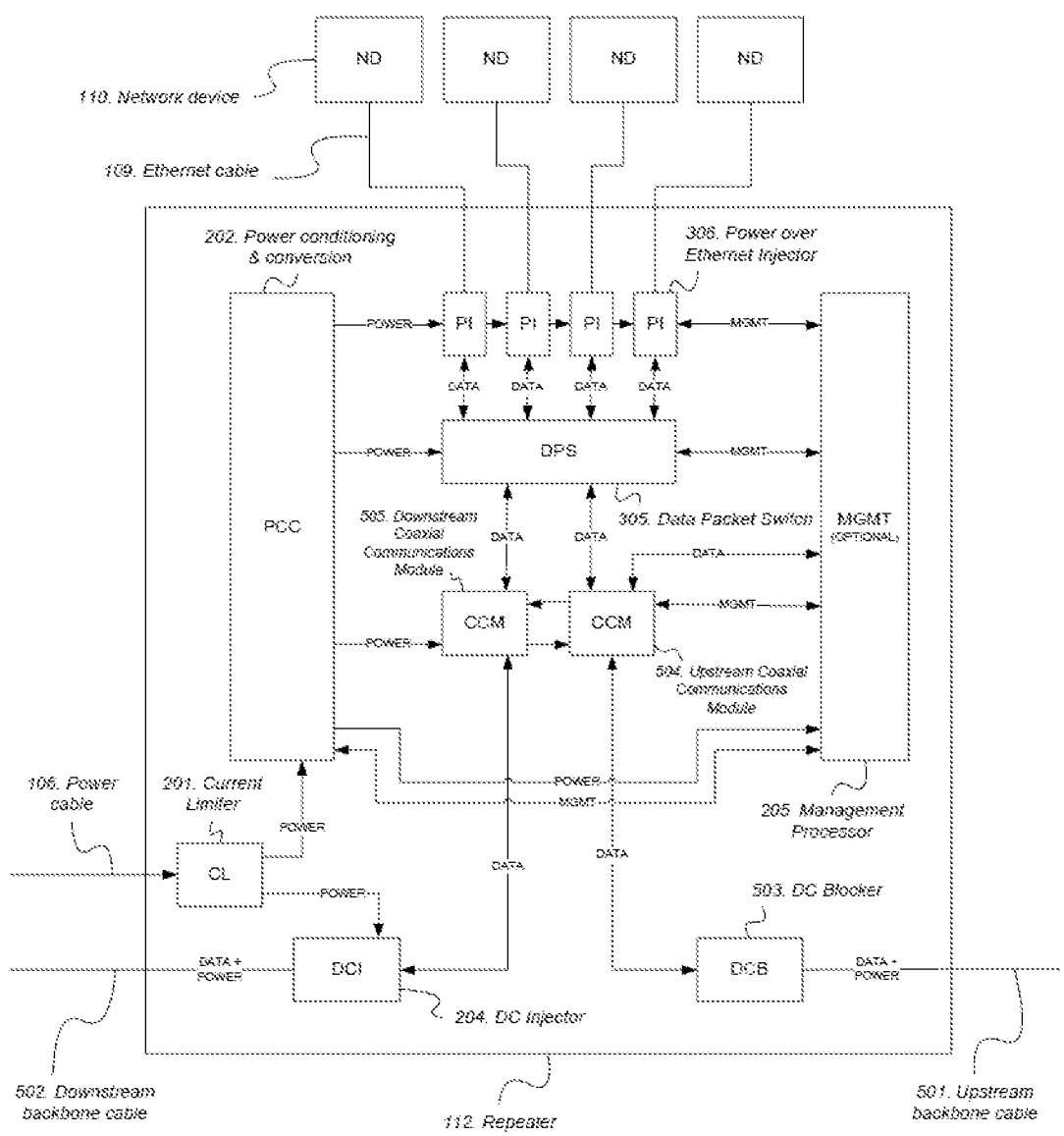
FIG. 5 illustrates a functional block diagram of an example repeater module.

The functional block diagram of the Repeater 112 is illustrated in FIG. 5. The Repeater accepts an incoming backbone cable 501, which is only used for data communications. The signal from this incoming backbone cable is passed through a DC blocker 503 so that only the data signal is passed to the upstream Coaxial Communications Module (CCM) 504 and the power from that backbone cable is not used.

The Repeater requires an ELV power to be supplied to it via an external power cable 106, which sends its power to the current limiter 201. The current limiter ensures that a short circuit or over current event on the downstream backbone cable 502 does not damage the electronics and stops an overheating or fire scenario from arising.

The current limited power is passed to the Power Conditioning and Conversion (PCC) module 202 and the DC injector 204. The PCC module conditions and converts the incoming power to the formats required by the internal circuitry, which consists of the upstream CCM 504, the downstream CCM 505, the management module 205, the Data Packet Switch (DPS) 305 and the Power over Ethernet Injectors (PI) 306.

Each CCM converts data packets between Ethernet frames and a format suitable for transmission on the backbone cables. In the Repeater one CCM performs the upstream backbone communications and the other performs the downstream backbone communications. The downstream backbone data signal is combined with the power from the current limiter 201 by the DC injector 204 before placing the combination onto the downstream backbone cable 502.

This use of two CCMs in the Repeater allows the backbone data communications to be decoded and digitally re-created through the Data Packet Switch (DPS) 305, which each CCM is connected to via an Ethernet connection. The DPS also provides packet switching to and from the network devices 110 that are connected to the external ports of the Repeater via Ethernet cables 109.

The upstream CCM 504 also provides a data connection for the management module 205, which enables the remote monitoring and configuration capabilities of the device. The Power over Ethernet Injectors (PI) 306 insert power onto the Ethernet cable that connects to each external network device 110. This enables each network device to have a high speed data connection and optionally receive its power over a single Ethernet cable.

The management module 205 provides local and remote monitoring of the PCC module 202, the upstream CCM 504, the downstream CCM 505, the DPS 305 and each PI 306. Additionally, the management module allows a system administrator to be able to set the configuration of the PCC, CCMs, DPS and PIs either locally or remotely. The management module also allows the Repeater to be discovered on the network when its address is unknown and its position in the linear topology to be remotely determined.

Therefore, FIG. 5 illustrates a functional block diagram of an example repeater module adapted to operatively connect to a first transmission line and to a second transmission line. The repeater module includes a power input port configured to receive an input power. The repeater module is configured to receive a composite signal from the first transmission line, the composite signal including a data component, and to separate the composite signal to extract the data component. The repeater module is further configured to decode data and recreate the data to form a recreated data component, to combine a portion, or a first portion, of the input power and the recreated data component to generate a recreated composite signal, and to transmit the recreated composite signal along the second transmission line.

Figure 14:
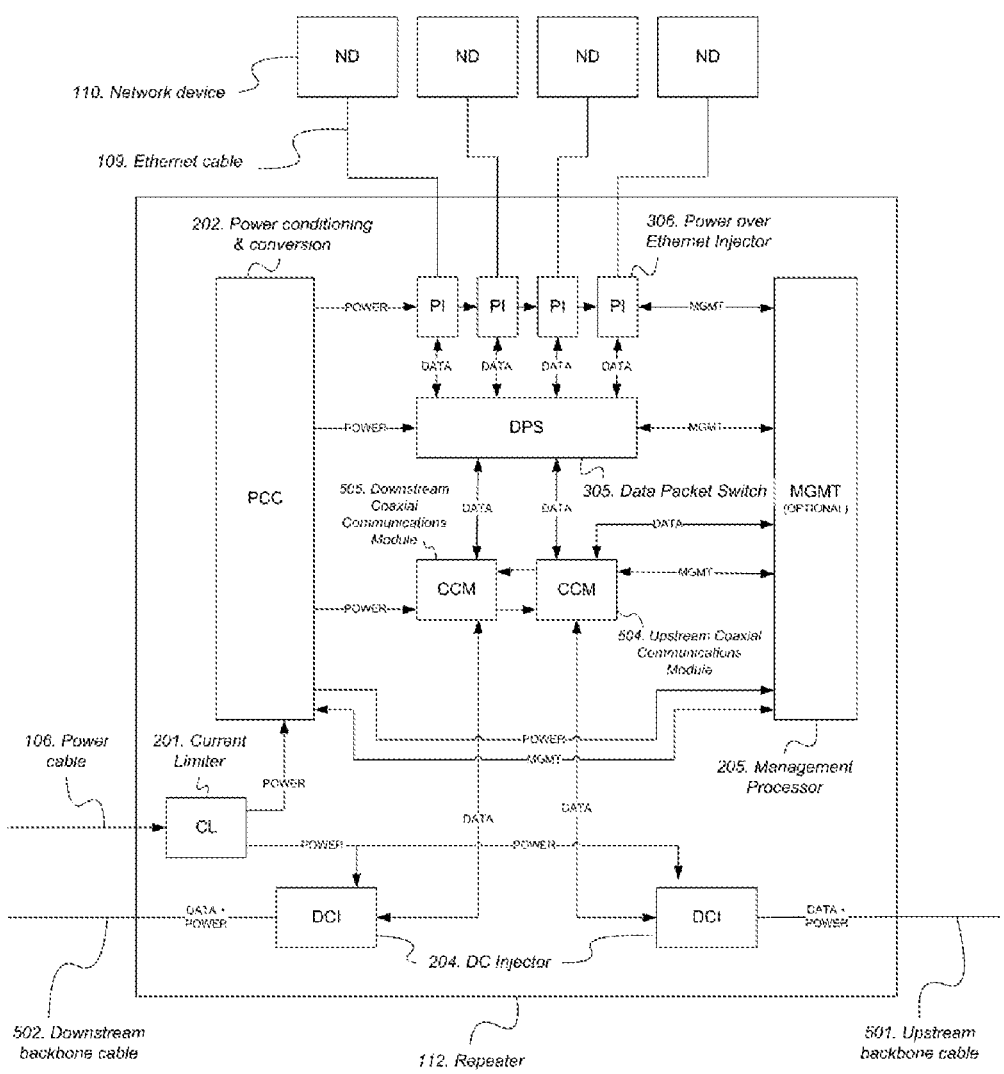
FIG. 14 illustrates a functional block diagram of another example repeater module.

Referring to FIG. 14, there is illustrated a functional block diagram of another example repeater module adapted to operatively connect to a first transmission line and to a second transmission line. The repeater module connects to the first transmission line and to the second transmission line through DC (or power) injector 204. The example repeater module of FIG. 14 accepts an incoming backbone cable 501, which is only used by the repeater module for data communications. The signal from this incoming backbone cable is passed through a DC injector 204 so that only the data signal is passed to the upstream Coaxial Communications Module (CCM) 504 and the power from that backbone cable is not used. Separately, power is provided to the repeater module through power cable 106. The power is optionally current limited and then passed to the Power Conditioning and Conversion (PCC) module 202 and to both DC injectors 204. At each DC injector 204, power is transmitted along each transmission line, possibly in combination with data signals.

Therefore, in some examples, the repeater module inserts or injects power into both the first and second transmission lines. In some examples, the repeater module is further configured transmit a further portion of the input power along the first transmission line. In some examples, the repeater may be further configured to combine the further portion of the input power with data (such as output data) to generate an output composite signal, and to transmit the output composite signal along the first transmission line.

In some examples, the composite signal further includes, or optionally includes, a power component. In some examples, the repeater module is configured to suppress, or discard the power component.

In some examples, the first transmission line and/or the second transmission line is a two-conductor transmission line, such as a ladder line, coaxial cable, stripline, or microstrip. Preferably, though not necessarily, the transmission line is a coaxial cable. In some examples, the coaxial cable is one of a leaky feeder coaxial cable or a hard line coaxial cable.

In some examples, as illustrated in FIG. 5, the repeater module further includes a connection point adapted to connect to a network device. In some examples, the repeater module is further configured to transmit data to the network device through the connection point. In some examples, the repeater module is further configured to supply a further portion, or a second portion, of the input power to the network device through the connection point.

In some examples, the repeater module further includes one or more connection points, each connection point being adapted to connect to a network device. In some examples, the repeater module is further configured to transmit data to network devices through the one or more connection points. In some examples, the repeater module is further configured to supply a further portion of the input power to network devices through at least one of the one or more connection points. In some examples, wherein the repeater module supplies the power through the at least one of the one or more connection points in a manner compatible with any Power over Ethernet specification.

In other examples (not illustrated), the repeater may not include any connection point adapted to connect to a network device. In such examples, the repeater module would decode and recreate data (and combine the recreated data with power for transmission along a transmission line) without directly communicating with or powering any network device.

In some examples, the repeater module includes two or more connection points adapted to connect to two or more network devices. In some examples, the repeater module includes four connection points adapted to connect to four network devices.

In some examples, the repeater module further includes a data port 603 configured to receive and/or transmit data. In some examples, the repeater module is further configured to connect to an external network through the data port. In some examples, the data port is one of an Ethernet port or a fibre optic port.

In general, any module (such as an electrical module, a repeater module, or a portal module) may include a data port, or a data-only port, that is not configured for the supply of power, and is only configured to receive and/or transmit data. The module may connect to an external network through the data port (or through a network switch connected to the data port). The data port may be configured to receive data which the module then forwards on to a network device, or to receive data for operating or managing the module, or to receive data for transmission on the transmission line. The data port may be further configured to transmit data, such as output data from a network device or from the transmission line, or from the module itself. In some examples, the data port is an Ethernet port for connecting, for example, to RJ45 copper cable, or to any other type of Ethernet cable. In other examples, the data port is a fibre optic port for connecting, for example, to an SM LC fibre optic cable, or to any other type of fibre optic cable. In other examples, the data port is a USB port or serial communication port. In some examples, the data port is a connection point adapted to connect to a network device, where the data port is configured for data transfer to and from the network device, but not to supply power to the network device.

In examples where the repeater module is connected to two or more network devices, the repeater module is configured to transmit data to the two or more network devices through the two or more connection points. Different data signals, frames, or packets may be transmitted to each network device, in which case the repeater module may be configured to switch or route each specific data packet to its corresponding network device. Similarly, the repeater module is further configured to supply power to the two or more network devices through the two or more connection points. Different power signals may be supplied to each network device, in accordance with its power requirements, in which case the repeater module may be configured to condition the power component of the composite signal to produce two or more power signals tailored for the two or more network devices.

In some examples, the connection point is an Ethernet port. In some examples, the repeater module transmits the data to the network device using an Ethernet specification. Furthermore, in some examples, the repeater module supplies the power to the network device using a Power over Ethernet specification, or in a manner compatible with any Power over Ethernet specification. This is advantageous since it allows the repeater module to supply both data and power to the network device through one port (i.e. the connection point) and along one single connection, which may be implemented by an Ethernet cable. In other examples, the repeater module may transmit data to the network device through a first port, and supply power to the network device through a second port.

In some examples, the repeater module is further configured to convert a format of the data. For example, the repeater module may convert a format of the data prior to transmitting it to the network device through the connection point. The repeater module may convert the data to a format suitable for the network device, such as an Ethernet format.

In some examples, the repeater module is further configured to receive output data from the network device. In some examples, the repeater module is further configured to convert a format of the output data, for examples, to a format that is suitable for transmission on the transmission line. In some examples, the repeater module is further configured to transmit the output data along the transmission line. Therefore, the repeater module may be configured to communicate to network devices, or to permit communication between network devices and other network devices or modules connected to the transmission line, by allowing the transfer of data to the network device, and by allowing the transfer of output data from the network device.

In some examples, the repeater module further includes data packet switching circuitry or circuits for routing frames, packets, or signals of the data and/or of the output data between the repeater module and the network device.

In some examples, the repeater module is further configured to be remotely monitored. In some examples, the repeater module is further configured to be remotely configurable, or programmable, for configuring internal settings of the repeater module. To this end, the repeater module may include a management module. In some examples, these functions may be performed locally. In some examples, the repeater module further includes a configuration port, which may be connected to the management module, for monitoring, performing diagnostics tests, configuring, or programming the repeater module. The configuration port may be one of a USB port or a serial port, or any other type of port. In some examples, the configuration port is the data only port as described above.

In some examples, the repeater module is further configured to condition the power or the input power. For example, the repeater module may condition the power prior to supplying it to the network device through the connection point, in order to satisfy specific power requirements of the network device. In some examples, the repeater module conditions the power to provide a power signal for powering the network device.

In some examples, the repeater module is further configured to power internal circuitry or circuits of the repeater module using a further portion, or a second portion, of the input power. The repeater module may condition the further portion of the input power accordingly. Examples of internal circuitry of the portal module include the DCE, PCC, CCM, DPS, PI, and MGMT, as well as any other circuitry necessary for operation of the repeater module. Therefore, in some examples, the repeater module is configured to power itself, as well as to supply power to the network devices through the connection point.

Figure 15:
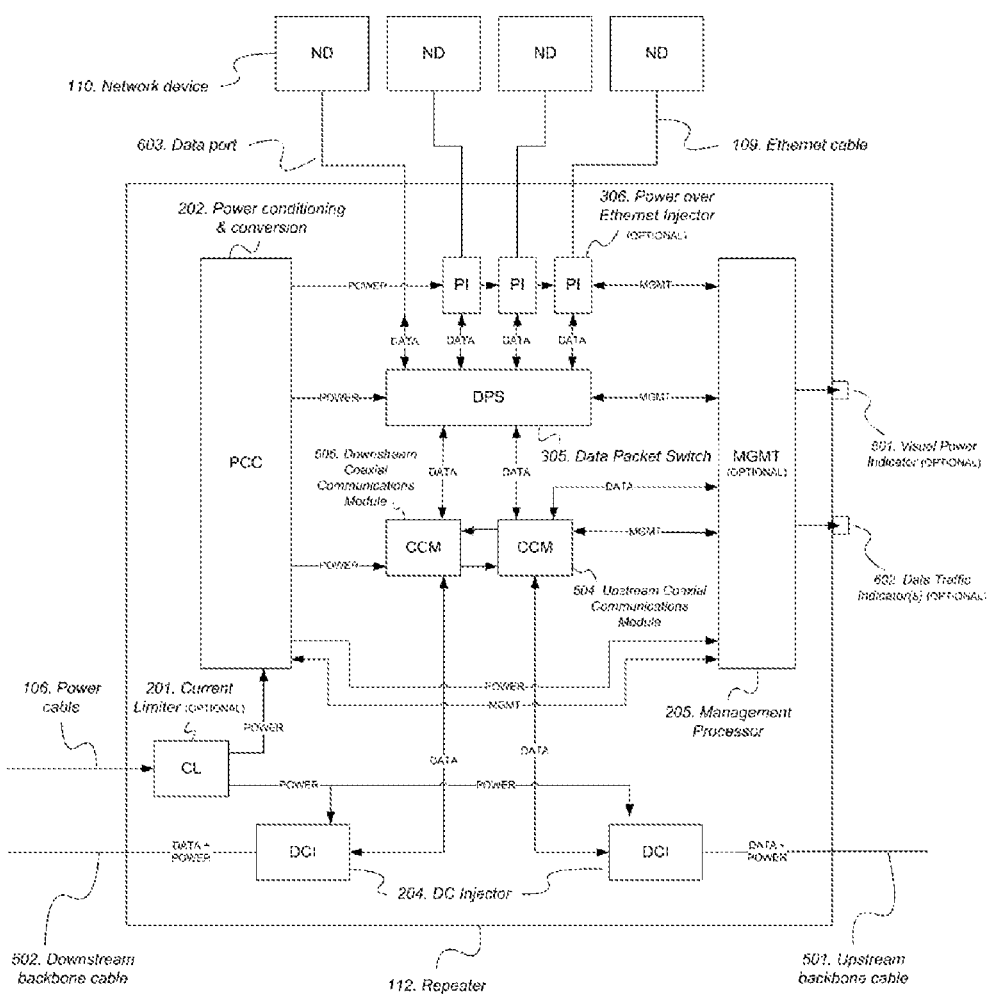
FIG. 15 illustrates a functional block diagram of another example repeater module; and, FIG. 16 illustrates a functional block diagram of another example repeater module.

Referring to FIG. 15, in some examples the repeater module further includes a visual power-indicator 601 configured to indicate a level of the input power relative to a power requirement of the repeater module. In some examples, the visual power-indicator is a light indicator having two different states to indicate the level of the input power relative to the power requirement of the repeater module. In some examples, the light indicator has three or more different states to indicate the level of the input power relative to the power requirement of the repeater module. In some examples, the repeater module further includes a visual data-indicator, or data-traffic indicator, 602 configured to indicate data traffic along one of the first transmission line or the second transmission line.

In general, any module (such as an electrical module, a repeater module, or a portal module) may include a visual power-indicator to indicate a level of an input power, or of a power signal, relative to a power requirement of the module and/or network devices connected to the module. This is a measure of whether the power is sufficient for powering, for example, internal circuitry of the module, and/or network devices connected to the module. Therefore, the level of the power relative to a power requirement may vary depending on the type of network devices, or the number of network devices, connected to the module. For example, a low power level may be sufficient to power one network device, but not two network devices. The visual power-indicator would allow a user to determine whether the power supplied to the module is sufficient to power the module and/or network devices. The module would have corresponding circuitry to measure or determine a power or voltage level. The power being measured may be the power component on a transmission line, or it may be the power being supplied to a network device through a connection point. Therefore, the module may include two or more visual power-indicators. For example, the module may include a visual power-indicator at an input port of the module, where the module connects to the transmission line and/or at a connection point, where the module connects to a network device.

Preferably, though not necessarily, the visual power-indicator is a light indicator, such as a light-emitting diode (LED). Therefore, a light indicates the availability of sufficient voltage and/or power to operate. In some examples, the light indicator has two different states to indicate the level of the power input to the module relative to a power requirement of the module. For example, a green-coloured light may indicate that sufficient power is available, and a red-coloured light may indicate that the power is insufficient. In some examples, the light indicator has three or more different states to indicate the level of power input to the module relative to a power requirement of the module. For example, an orange-coloured light may indicate that the power is only slightly insufficient. In some examples, the visual indicator may include a display indicating a power or voltage level.

In general, any module (such as an electrical module, a repeater module, or a portal module) may include one or more visual data-indicators, or data traffic-indicators, configured to indicate data traffic along a transmission line, where the data traffic may be caused by data being received and/or sent by the module. In some examples, the visual data-indicator indicates that a data link is established and that data traffic is flowing over the coaxial cable. The visual data-indicator may be a light indicator, such as an LED, with two or more different states to indicate data flow. For example, a red-coloured light may indicate that a data link has not been established and that data cannot flow, while a green-coloured light may indicate that a data link has been established between the module and other modules or network devices, and that data may therefore be successfully transmitted and/or received.

In some examples, the repeater module separates the composite signal by filtering the composite signal. In order to separate the composite signal, the repeater module must separate, or demultiplex, the composite signal into its respective data component and power component. In some examples, the data component is a signal, or a plurality or collection of signals, having a frequency which may range from the kilohertz to the megahertz range (or any other frequency). In some examples, the data to be decoded or the data to be transmitted to the network device is derived from the data component of the composite signal. In some examples, the data to be decoded or the data to be transmitted to the network device is the data component. In some examples, the power for powering the network device is derived from the input power.

The data component may include one or more data signals, frames, or packets, addressed to one or more network devices, or to the repeater module itself. For example, the data component may include a first data signal containing operation instructions for the repeater module, and a second data signal containing information for the network device connected to the repeater module. In some examples, the input power is a DC power (or a low-frequency power) having sufficient electrical power for powering the repeater module and/or network devices connected to the repeater module.

In some examples, the repeater module further includes a filter module for filtering the composite signal. The filter module includes a high-pass filter or a band-pass filter to extract, or isolate, the data component. In other examples, the filter module may include other types of filters, for examples, multiple band-pass filters for extracting, or isolating, multiple data signals within the data component of the composite signal. In some examples, the filter module is a bias tee.

In some examples, the network device is a gateway, modem, network switch, or other device to connect to an external network. In some examples, the connection point is a data port adapted to connect to an external network. In some examples, the external network is an Ethernet network. In other examples, the external network may be any other network, such as a LAN network or a fibre-optic network. In some examples, the repeater module is configured to transmit data to the external network through the connection point, and to receive output data from the external network. Therefore, the repeater module may allow for the transfer of data to and from the external network and one or more other network devices or modules of the telecommunication system.

Figure 6:
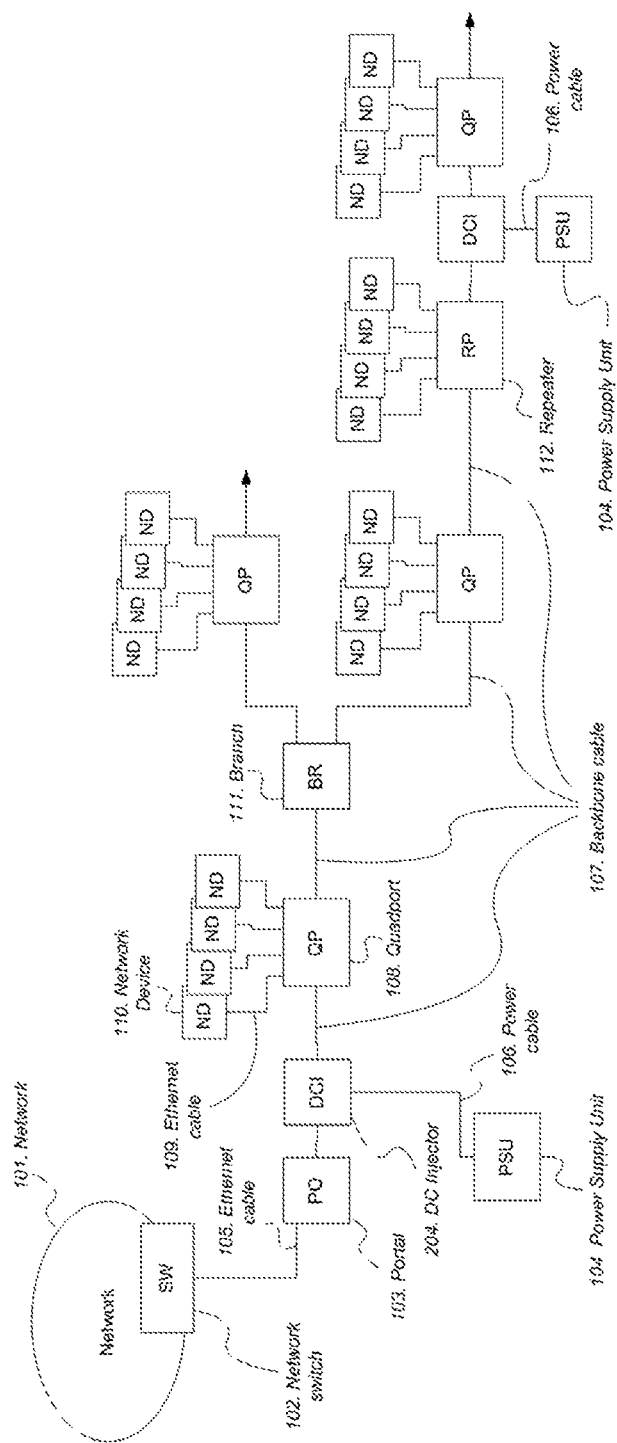
FIG. 6 illustrates another example telecommunication system.

Referring to FIG. 6, there is provided a further example telecommunication system including a portal module 103 connected to external network 101 through network switch 102 and Ethernet cable 105, a branch 111, electrical modules (i.e. Quadports) 108 and a repeater module 112 connected to network devices 110, and transmission lines illustrated as backbone cables 107. In the example telecommunication system of FIG. 6, power from power supply units 104 is inserted to the transmission line through DC injectors 204.

Therefore, in the configuration illustrated in FIG. 6, no external power need be supplied directly to the portal and repeater modules. Instead, external power from power supply units 104 is inserted to the communication system through DC injector 204 connected to the transmission line. Power supply units 104 may be any power sources, such as a mains power system, a generator, or a battery.

Figure 7:
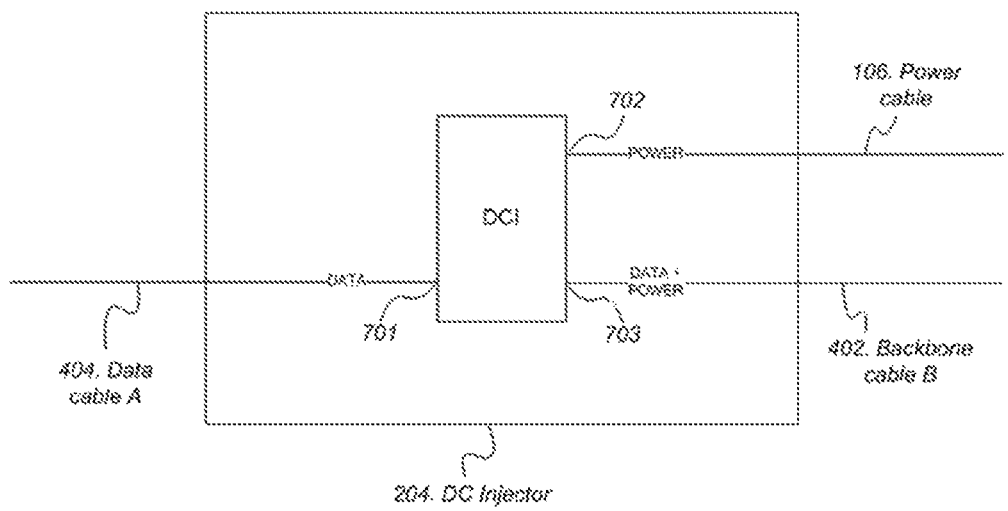
FIG. 7 illustrates a functional block diagram of an example DC injector module.

Referring to FIG. 7, there is illustrated an example DC injector including a first input port 701, a second input port 702, and one output port 703. The DC injector combines the electrical signals of the first and second input ports and outputs them through the output port. In the example illustrated in FIG. 7, first input port 701 carries data, which may include one or more data signals at different frequencies, whilst second input port 702 carries power, which may include a DC or near-DC power signal. The DC injector combines the data and power to form a composite signal including data and power components, outputted through output port 703.

The example DC injector illustrated in FIG. 7 may couple the portal module 103 to the transmission line of the telecommunication system, as illustrated in FIG. 6. For example, portal module 103 may connect to first input port 701 through data cable 404. A power supply may connect to second input port 702 through power cable 106. Output port 703 may connect to another telecommunication system module through backbone cable 402. In some examples, data cable 404 and backbone cable 402 are transmission lines adapted to transport or carry both data and power signals. In other examples, the DC injector illustrated in FIG. 7 may couple any other module (e.g. a repeater module or an electrical module) to the transmission line of the telecommunication system. For example, a repeater module or an electrical module may connect to first input port 701. That is, in some examples, power may be introduced, injected, or combined with a data signal, at any point in the telecommunication system, between any two modules of the telecommunication system.

Figure 8:
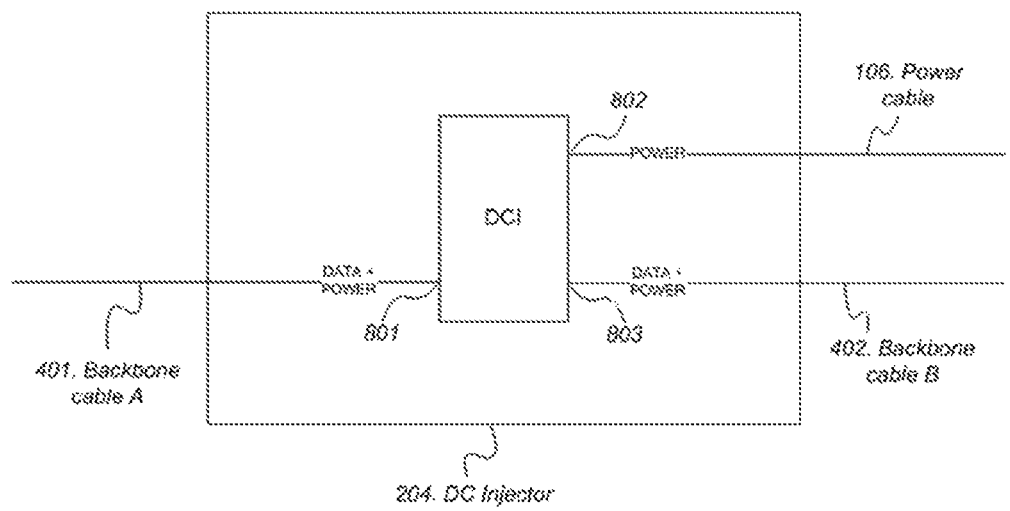
FIG. 8 illustrates a functional block diagram of another example DC injector module.

Referring to FIG. 8, there is illustrated another example DC injector including an input port 802, a first output port 801, and a second output port 803. The transmission from the first output port to the second output port has a high-pass or band-pass filter characteristic. The transmission from the second output port to the first output port has a high-pass or band-pass filter characteristic. The transmission from the input port to the first output port has a low-pass filter characteristic. The transmission from the input port to the second output port has a low-pass filter characteristic. In some examples, the DC injector of FIG. 3 may be implemented with a bias tee or a diplexer. In the example illustrated in FIG. 8, first output port 801 carries a composite signal including data and power components, where the power component is a DC or near-DC power signal sourced from the input port 802, whilst the data component includes one or more non-zero frequency components. The second output port 803 carries a composite signal including data and power components, where the power component is a DC or near-DC power signal sourced from the input port 802, whilst the data component includes one or more non-zero frequency components. The input port 802 carries power, which may include a DC or near-DC power signal. The data component passes in a bidirectional manner between output port 801 and output port 803. In this way this example DC injector can supply power to two lengths of transmission line, whilst allowing data signals and/or radio frequency signals to pass in a bidirectional manner between the two lengths of transmission line.

Figure 9:
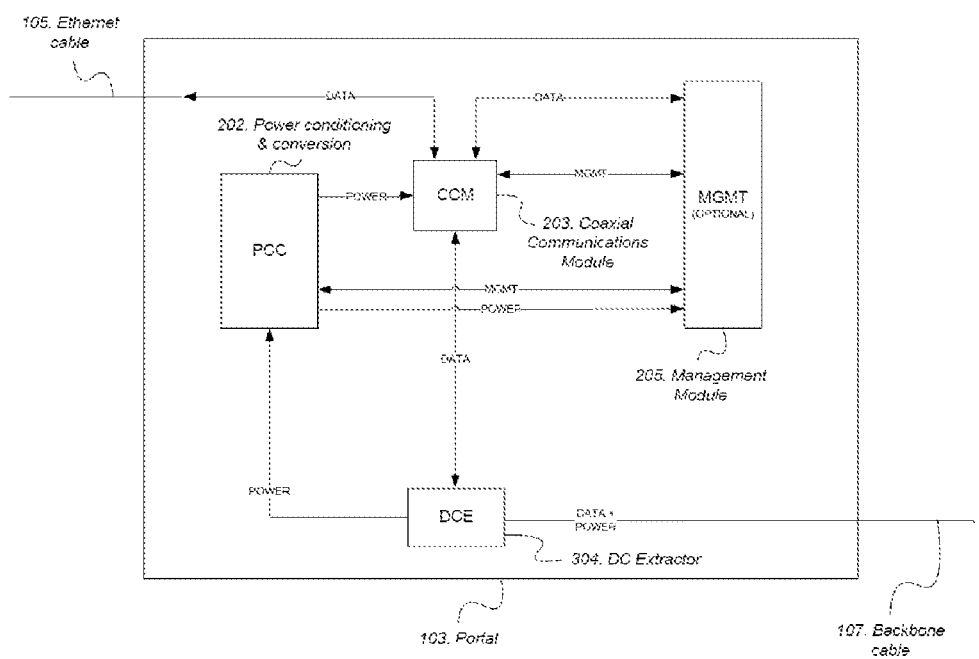
FIG. 9 illustrates a functional block diagram of another example portal module.

Referring to FIG. 9, there is illustrated a functional block diagram of an example portal module 103 of the telecommunication system of FIG. 6. The Portal accepts an incoming backbone cable 107, which carries the data and power signals. This connects to a DC Extractor 304 that splits the power from the data signal, with the power being sent to the Power Conditioning and Conversion (PCC) module 202, and the data signal connected to the Coaxial Communications Module (CCM) 203.

The PCC module conditions and converts the incoming power to the formats required by the Coaxial Communications Module (CCM) 203 and the management module 205.

The CCM accepts an external network connection via an Ethernet cable 105, which in this example is used as an uplink to the site's existing network. The CCM converts the data packets between Ethernet frames and a format that is suitable for transmission on the backbone cable 107.

The CCM also provides a data connection for the optional management module 205, which, if included, enables the remote monitoring and configuration capabilities of the portal module. The management module 205 provides local and remote monitoring of the PCC module 202 and the CCM 203.

The management module 205 allows a system administrator to be able to set the configuration of the PCC and CCM either locally or remotely. The management module 205 also allows the portal module to be discovered on the network when its network address is unknown and its position in the linear topology needs to be remotely determined.

Therefore, FIG. 9 illustrates an example portal module adapted to operatively connect to a transmission line. The portal module includes a data port configured to receive input data from an external network, and/or to transmit output data received from the transmission line. The portal module is configured to receive a composite signal from the transmission line, the composite signal including a data component and a power component, and to separate the composite signal to extract the data component and the power component.

Where the data component includes output data, the portal module is further configured transmit the output data to the external network through the data port. In some examples, the portal module is further configured to receive input data through the data port and to transmit the input data along the transmission line.

In some examples, the portal module is further configured to condition the power component. In some examples, the portal module is further configured to power internal circuitry of the portal module using a portion of the input power. The portal module may condition the portion of the input power accordingly. Examples of internal circuitry of the portal module include the DCE, PCC, CCM, and MGMT, as well as any other circuitry necessary for operation of the portal module. Therefore, in some examples, the portal module is configured to power itself.

Figure 10:
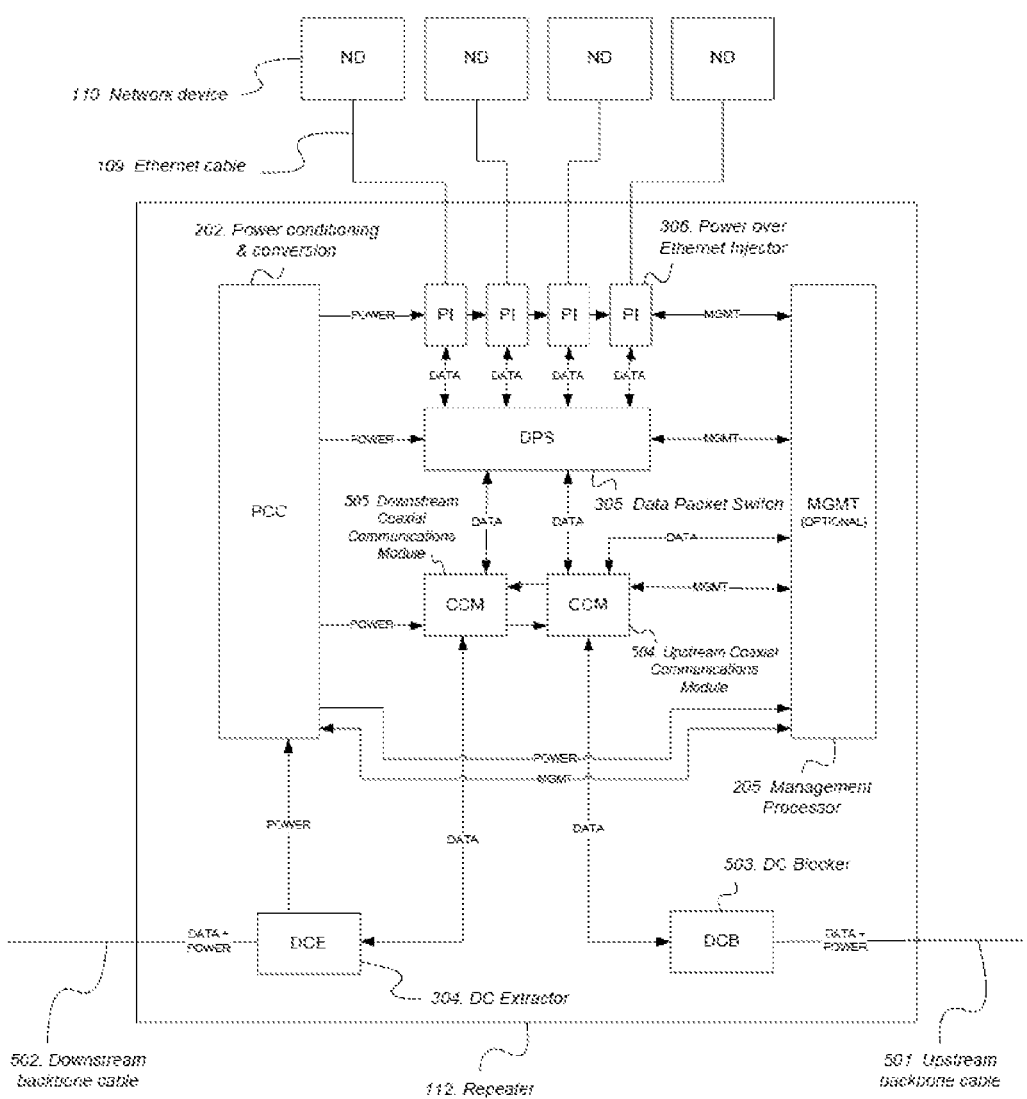
FIG. 10 illustrates a functional block diagram of another example repeater module.

Referring to FIG. 10, there is illustrated a functional block diagram of an example repeater module 112 of the telecommunication system of FIG. 6. Repeater module 112 accepts an incoming backbone cable 501, which carries the data and power signals. The signal from this incoming backbone cable is passed through a DC blocker 503 so that only the data signal is passed to the upstream Coaxial Communications Module (CCM) 504 and the power from that backbone cable is not used. The functioning of the repeater module proceeds as described above with reference to FIG. 5.

Therefore, FIG. 10 illustrates an example repeater module adapted to operatively connect to a first transmission line and to a second transmission line. The repeater module is configured to receive a composite signal from the first transmission line, the composite signal including a data component and a power component, and to separate the composite signal to extract the data component and the power component. The repeater module is further configured to decode data and recreate the data to form a recreated data component, and to transmit the recreated data component along the second transmission line.

In some examples, the repeater module is further configured to power internal circuitry or circuits of the repeater module using a portion of the power component.

Figure 16:
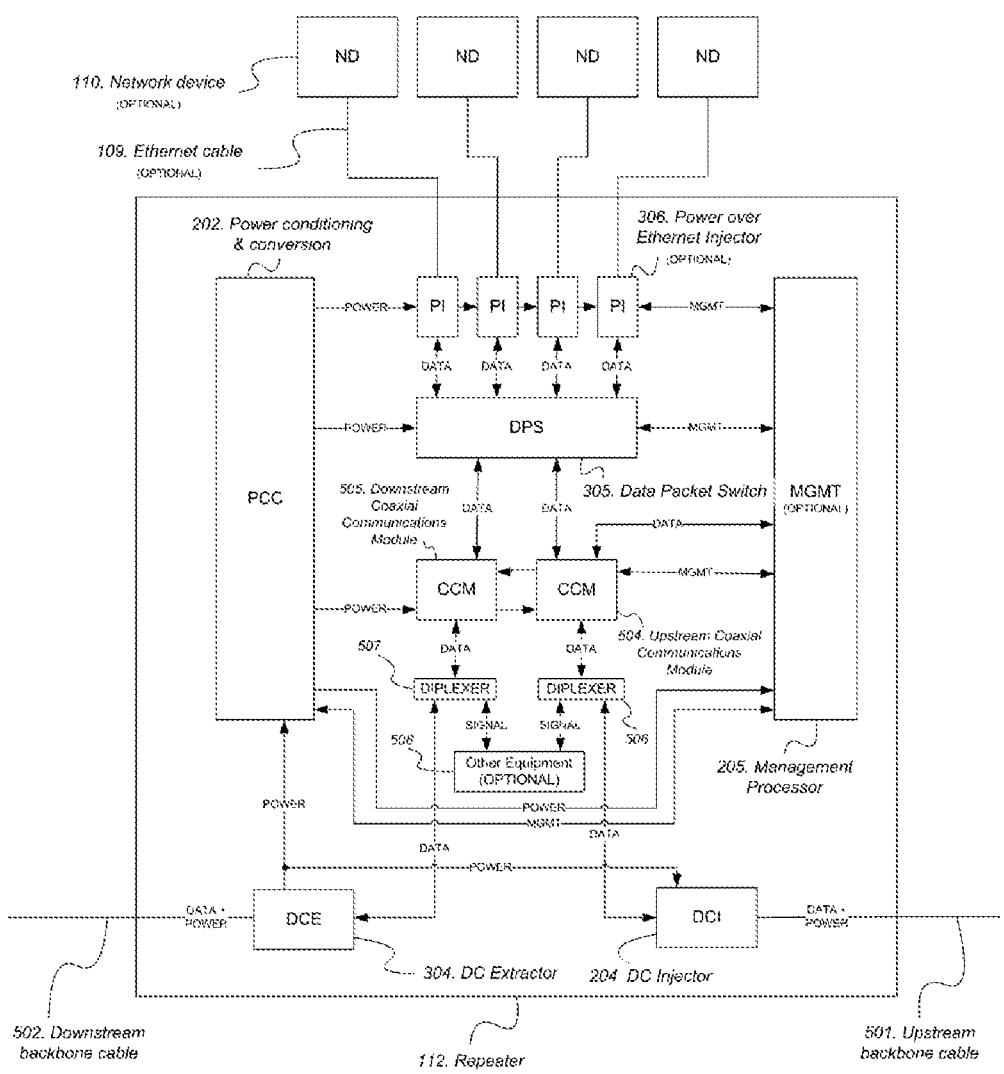

In some examples, illustrated in FIG. 16, the repeater may further be configured to combine a portion of the power component and the recreated data component to generate a recreated composite signal, and to transmit the recreated composite signal along the second transmission line. To achieve this, the repeater module may include a DC Injector 204 for combining the portion of the power component and the recreated data component.

Therefore, in some examples, the repeater module is further configured to provide, insert, or inject a portion of the power component, or of an input power, to the to the first and/or second transmission line. In some examples, the composite signal including the power component, or the input power, may be received from the first transmission line or from the second transmission line. The repeater module may then be configured to insert or inject a portion of the power component into the other of the first transmission line or the second transmission line.

In some examples, the repeater module is further configured to power internal circuitry or circuits of the repeater module using a further portion of the power component.

In some examples, as illustrated in FIG. 10, the repeater module includes a connection point adapted to connect to a network device. In some examples, the repeater module is further configured to transmit data to the network device through the connection point. In some examples, the repeater module is further configured to supply power to the network device through the connection point.

In other examples, as illustrated in FIG. 16 which indicates optional features of the repeater module, the repeater module may not include any connection point adapted to connect to a network device. In such examples, the repeater module would decode and recreate data (and optionally combine the recreated data with power for transmission along a transmission line) without directly communicating with or powering any network device.

In some examples, the composite signal further includes a radio frequency component. Preferably, though not necessarily, the radio frequency component has a higher frequency, or is in a higher frequency band, compared to the data component of the composite signal. In other examples, the radio frequency component has a lower frequency, or is in a lower frequency band, compared to the data component of the composite signal. In other examples, the data component is a radio frequency component (i.e. the data component has a frequency, or is in a frequency band, that corresponds to a radio frequency, or to a microwave frequency). In some examples, the data component includes a radio frequency component.

In some examples, the first transmission line and/or the second transmission line is a leaky feeder coaxial cable. In some examples, the repeater module is further configured to separate the composite signal to extract, isolate, or set apart, the radio frequency component. This may occur through a multi-stage process. For example the repeater module may separate the composite signal to extract the power component and a combination of the data component and the radio frequency component. The repeater module may then separate, or demultiplex, the combination to extract, isolate, or set apart the data component and the radio frequency component. In some examples, the repeater module includes a diplexer to extract the radio frequency component. In other examples, the repeater may include any other filter device to extract or isolate the radio frequency component, including but not limited to, one or more high-pass or band-pass filters, or a triplexer, or a quadplexer.

Figure 11:
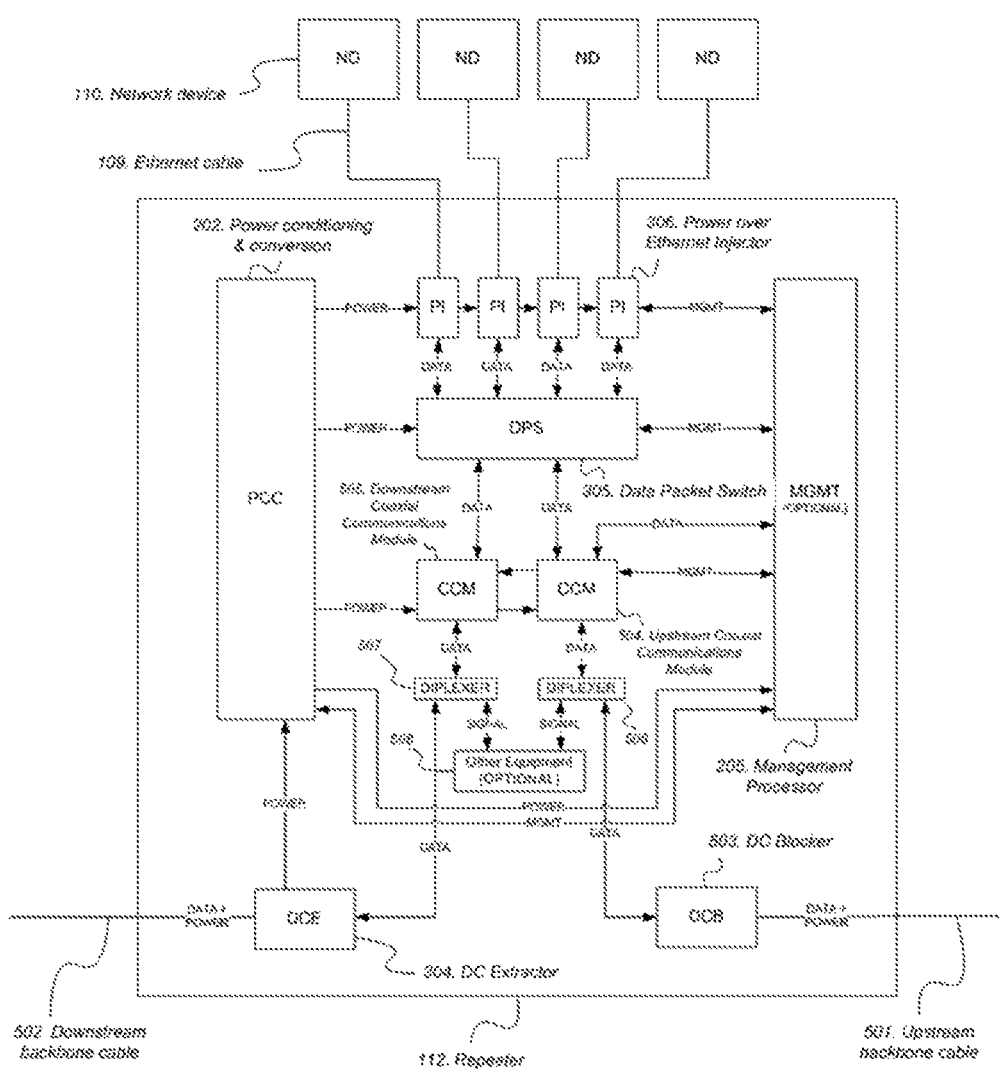
FIG. 11 illustrates a functional block diagram of another example repeater module.

Referring to FIGS. 11 and 16, there are illustrated further example repeater modules, further including a first diplexer 506 and a second diplexer 507. DC Blocker 503 is connected to the input/output or general port of first diplexer 506. As described above, DC Blocker 503 suppresses the power component of a composite signal incoming from upstream backbone cable 501. The data component and the radio frequency then propagate from DC blocker 503 into the input/output, or general, port of first diplexer 506, where they are separated.

In general, a diplexer has an input/output or general port, a high frequency port, and a low frequency port. The transmission from the general port to the high frequency port has a high-pass or band-pass filter characteristic, whilst the transmission from the general port to the low frequency port has a low-pass filter characteristic. In some examples, where the radio frequency component has a higher frequency than the data component of the composite signal, the radio frequency component is outputted from the high frequency port of first diplexer 506, whilst the data component is outputted from the low frequency port of first diplexer 506. In other examples, where the radio frequency component has a lower frequency than the data component of the composite signal, the radio frequency component is outputted from the low frequency port of first diplexer 506, whilst the data component is outputted from the high frequency port of first diplexer 506. In general, first diplexer 506 demultiplexes the radio frequency component and the data component of the composite signal.

The radio frequency component is then passed or sent through equipment 508, and input into the high frequency port of second diplexer 507. Second diplexer 507 combines, or multiplexes, the radio frequency component with a data component input to its low frequency port. The combined, or multiplexed, signal is then outputted from the general port of second diplexer 507, wherein it is sent through DC Extractor 304 and transmitted along downstream backbone cable 502.

The process described above is for an example where a radio frequency component enters repeater module 112 from upstream backbone cable 501 and exits onto downstream backbone cable 502. In general, the repeater module is bidirectional, adapted to receive a composite signal from the first transmission line and to transmit any signal along the second transmission line, and vice versa. The process described above therefore works analogously for a radio frequency component entering repeater module 112 from downstream backbone cable 502 and exiting onto upstream backbone cable 501.

In some examples, equipment 508 is a radio frequency amplifier, such as a leaky feeder amplifier. Preferably, though not necessarily, the radio frequency amplifier is bidirectional. In some examples, equipment 508 may be any other equipment, such as radio frequency equipment, including radiating cable, such as leaky feeder coaxial cable, antennas, radio modems, or any other type of radio frequency equipment. Equipment 508 is optional and, in other examples, may be omitted. In such examples, equipment 508 may simply be replaced by a coaxial cable connecting the high frequency ports of first diplexer 506 and second diplexer 507, so as to allow a radio frequency component to propagate through repeater 112 without substantial processing.

Therefore, in some examples, the repeater module further includes two diplexers, each diplexer having a high frequency (or radio frequency) input/output ports, wherein the high frequency port of the first diplexer is interconnected to the high frequency port of the second diplexer. In some examples, the repeater module is further configured send the radio frequency component through the first diplexer, and to collect the radio frequency component from the second diplexer. In some examples, the high frequency ports of the first and second diplexers are interconnected by a coaxial cable. In some examples, the high frequency ports of the first and second diplexers are interconnected by a radio frequency amplifier, or a bidirectional radio frequency amplifier.

In some examples, the repeater module is further configured to transmit the collected radio frequency component along the second transmission line. In some examples, the repeater module is further configured to relay, or pass the radio frequency component to the second transmission line. In some examples, the repeater module is adapted to connect to an end of a first leaky feeder coaxial cable, and an end of a second leady feeder coaxial cable. In some examples, the repeater module allows the radio frequency component to pass in either direction between the end of the first leaky feeder coaxial cable and the end of the second leaky feeder coaxial cable. In some examples, the repeater module allows the radio frequency component to pass in either direction between the end of the first leaky feeder coaxial cable and another device, as well as between the end of the second leaky feeder coaxial cable and another device.

In some examples, the repeater module further includes a radio frequency amplifier, and the repeater module is further configured to input the radio frequency component into the radio frequency amplifier to produce an amplified radio frequency component at the amplifier's output. The repeater module is further configured to transmit the amplified radio frequency component along the second transmission line. In some examples, the radio frequency amplifier is a bidirectional radio frequency amplifier, having a first and a second port, wherein each of the first port and the second port is adapted to receive an input signal or to emit an output signal.

In some examples, the repeater module is further configured to transmit the radio frequency component along the second transmission line. This may be done without amplification, or without any processing of the radio frequency component. In such examples, the repeater may be configured to relay or pass the radio frequency component from the first transmission line to the second transmission line, or vice versa.

Preferably, though not necessarily, the repeater module is bidirectional, able to receive a data signal, or a composite signal including a data component, from either the first transmission line or the second transmission line. Moreover, the repeater module is able to receive a power signal, or a composite signal including a power component, from either the first transmission line or the second transmission line. In some examples, the repeater module may receive a data component from the first transmission line, and a power component from the second transmission line, or vice versa.

Therefore, in some examples, the repeater module is configured to receive a composite signal from the first transmission line, the composite signal including a data component, and to receive a signal from the first transmission line or from the second transmission line, the signal including a power component. The repeater module is further configured to separate the composite signal to extract the data component, to separate the signal to extract the power component, to decode data and recreate the data to form a recreated data component, and to transmit the recreated data component along the second transmission line.

In some examples, the repeater module is configured to receive a composite signal from the first transmission line, the composite signal including a data component, and to receive a signal from the first transmission line or from the second transmission line, the signal including a power component. The repeater module is further configured to separate the composite signal to extract the data component, to separate the signal to extract the power component, to decode data and recreate the data to form a recreated data component, to combine a portion of the power component and the recreated data component to generate a recreated composite signal, and to transmit the recreated composite signal along the second transmission line.

In some examples, the composite signal including the data component is a first composite signal, and the signal including the power component is a second composite signal. In some examples, the signal is the composite signal from the first transmission line (i.e. the composite signal received from the first transmission line includes the data component and the power component).

Figure 13:
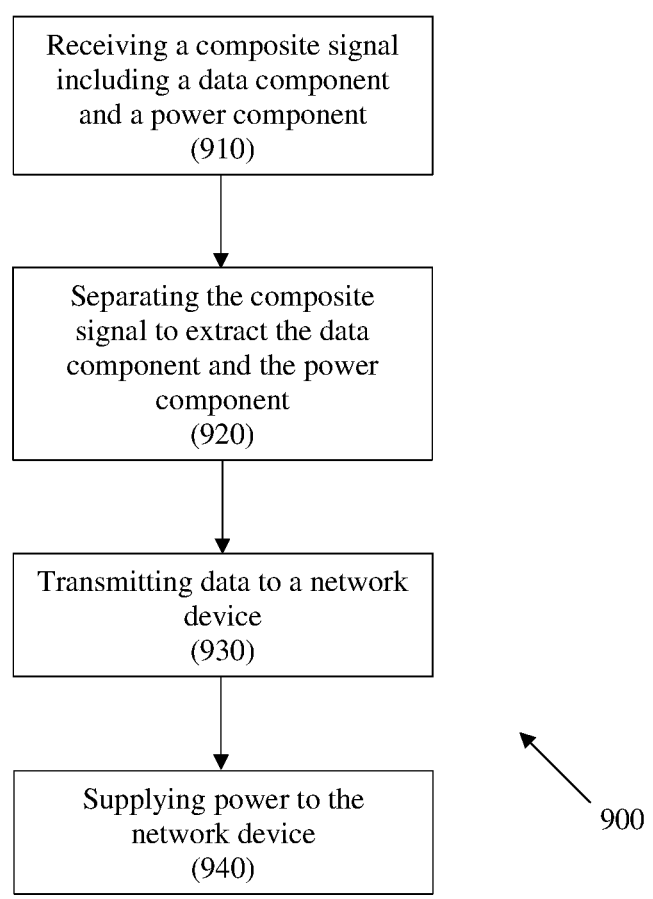
FIG. 13 illustrates an example method of data communication.

Referring to FIG. 13, there is illustrated an example method 900 of data communication. Method 900 includes step 910 of receiving, by an electrical module, a composite signal including a data component and a power component. Method 900 further includes step 920 of separating the composite signal to extract the data component and the power component. Method 900 further includes step 930 of transmitting data to a network device connected to the electrical module, and step 940 of supplying power to the network device.

In some examples, method 900 further includes the step of powering internal circuitry of the electrical module using a portion of the power component. In some examples, method 900 further includes the step of powering the network device using the supplied power.

Each of the nodes (Quadport, Repeater, Branch, and Portal), or modules, described above may optionally provide an indicator of the available power quality at that device. This indicator may be displayed on the external enclosure of the device such that an observer can determine if power is available, and if so, whether sufficient power is available.

The described modules and components may be combined or interconnected to provide a telecommunication system. In one example, there is provided a telecommunication system including a transmission line and an electrical module operatively connected to the transmission line. The electrical module includes a connection point. The telecommunication system further includes a network device connected to the connection point. The electrical module is configured to receive a composite signal from the transmission line, the composite signal including a data component and a power component, and to separate the composite signal to extract the data component and the power component. The electrical module is further configured to transmit data to the network device through the connection point, and to supply power to the network device through the connection point.

In some examples, the telecommunication system includes a repeater module instead of, or in addition to, an electrical module. The statements below may apply analogously to a repeater module.

In some examples, the composite signal includes a data component. In some examples, the composite signal includes a power component. In some examples, the composite signal may include only one of a data component (i.e. one or more data signals) or a power component (i.e. one or more power signals). Therefore, in some examples, an electrical module or a repeater module may not need to separate a composite signal.

In some examples, the network device is configured to be powered by the supplied power. In some examples, the electrical module is further configured to receive output data from the network device. In some examples, the electrical module is further configured to convert a format of the output data. In some examples, the electrical module is further configured to transmit the output data along the transmission line. In some examples, the electrical module is configured to transmit the output data along the transmission line using G.hn signaling.

In some examples, the electrical module further includes data packet switching circuitry for routing frames or packets of the data and of the output data between the electrical module and the network device. In some examples, the electrical module includes a managed switch that enables different protocols and/or data formats for sending data to a network device and/or for receiving data from a network device. In some examples, the electrical module simply transmits data from the transmission line to the network device, without altering a communication protocol and/or a format of the data.

In some examples, the network device is configured to communicate to other telecommunication system devices through the electrical module. For example, the network device may communicate to a destination network device by transmitting output data, or an output data signal, to the electrical module, which would then route and/or transmit the output data along the transmission line, and possibly through other modules (e.g. electrical modules or repeater modules) to the destination network device. In some examples, the network device does not have a direct communication link to any other network device in the telecommunication system. In other examples, the network device has a direct communication link to any other network device in the telecommunication system, and is able to communicate directly to the other network device.

In some examples, the telecommunication system further includes a second electrical module operatively connected to the transmission line, and a second network device connected to a second connection point of the second electrical module. In some examples, the second electrical module is configured to receive a second composite signal from the transmission line, the second composite signal including the output data. The second electrical module is further configured to separate the second composite signal to extract the output data, and to transmit data to the second network device through the second connection point, wherein the data is derived from the output data. The second electrical module may be directly connected to the same transmission line as the first module, or it may be directly connected to another, or a second transmission line, directly or indirectly connected to the transmission line of the first module. In any case, electrical signals must be able to propagate between the first electrical module and the second electrical module, through one or more transmission lines.

Therefore, in some examples, two network devices or modules in the telecommunication system can communicate directly between each other without the need for an external coordinating device. In some examples, two network devices or modules in the telecommunication system can communicate directly between each other, where either one of the network devices or modules is configured to coordinate the communication or exchange of data. That is, any network device or module that is on or powered can become a "master" device or module. If the master device or module drops off (e.g. if it fails or its cable is cut), then the remaining network devices or modules will auto-negotiate a new master device or module. This is advantageous because, if a cable is cut, or if any device in the system fails, the remaining devices that are still linked by a powered section of cable are still able to operate and to communicate with each other.

In some examples, a network device is one of a video camera, an electronic sign, a wireless network base station, an environmental sensor, or an actuator. In some examples, the network device is a gateway, modem, network switch, network router, or other device to connect to an external network. In some examples, the network device includes a fibre optic communication interface. In some examples, the telecommunication system is for a backhaul network, and wherein the transmission line is a backbone cable.

In some examples, multiple (i.e. two or more) modules are interconnected with one or more transmission lines to form a telecommunication system. The modules may include any module as described, such as an electrical module, a repeater module, or a portal module. Therefore, the telecommunication system can have multiple system modules on the same cable run (i.e. multi-point on the same cable). Each module may provide connection points for connecting to network devices or external networks. Each module may further include data ports, for example, for connecting to external networks, where the data port may be either an Ethernet port or a fibre optic port. Power may be inserted, or injected, at any locations in the telecommunication system (for example, through a portal module, or through a repeater module, or through a DC or power injector at any location along a transmission line).

Moreover, in some examples, the network devices can "see" other network devices on the telecommunication system, and can send data to other network devices through the telecommunication system and/or they can receive data from other network devices through the telecommunication system.

In some examples, the transmission line is a two-conductor transmission line, such as a ladder line, coaxial cable, stripline, and microstrip. Preferably, though not necessarily, the transmission line is a coaxial cable. In some examples, the coaxial cable is one of a leaky feeder coaxial cable or a hard line coaxial cable.

In one example, there is provided a telecommunication system including a transmission line, and three or more modules operatively connected to the transmission line, each module including a connection point adapted to connect to a network device. Each module is configured to receive a composite signal from the transmission line, the composite signal including a data component and a power component, and to separate the composite signal to extract the data component and the power component. Each module is further configured to transmit data through the connection point, and to power through the connection point.

In some examples, a first module of the three or more modules is further configured to receive output data through the connection point of the first module, and to transmit the output data along the transmission line. In some examples, a second module of the three or more modules is further configured to receive a second composite signal from the transmission line, the second composite signal including the output data, and to separate the second composite signal to extract the output data. In some examples, the second module is further configured to transmit data through the connection point of the second module, wherein the data is derived from the output data.

In some examples, the modules are electrical modules or repeater modules. In some examples, the telecommunication system includes three or more network devices, wherein each network devices is connected to a connection point of the three or more modules. Therefore, in a communication system including three or more network devices or modules on a transmission line segment, any two of those devices or modules can communicate directly with each other.

In some examples, each of the three or more modules is further configured to coordinate an exchange of data, or communication, between any two of the three or more modules. In some examples, any one of the three or more modules coordinates an exchange of data between the first module and the second module. The module that coordinates or manages communication between modules may be selected randomly amongst any of three or more modules that is on or powered, or it may be selected in accordance with any other protocol, and it may change over time based on the status of the telecommunication system.

In another example, there is provided a telecommunication system including a transmission line, a first module, and a second module operatively connected to the transmission line. In some examples, the telecommunication system further includes a power injector operatively connected to the transmission line, configured to inject, or insert, power or a power signal to the transmission line. In some examples, each of the first module and the second module is configured to receive the power signal from the transmission line, to receive input data (or input data signals) from other modules in the telecommunication system through the transmission line, and/or to transmit output data (or output data signals) along the transmission line to other modules in the telecommunication system. In some examples, the telecommunication system further includes one or more network devices, each network device being connected to a connection point of a module of the telecommunication system. In some examples, each of the first and the second module is configured to transmit data derived from the input data to a network device through the connection point. In some examples, each of the first and second modules is configured to supply power derived from the power signal to the network device through the connection point. In some examples, each of the first module and the second module is one of an electrical module or a repeater module.

In another example, there is provided a telecommunication system including a transmission line adapted to transport data and power, and a plurality of network devices operatively attached to the transmission line via a module. The module may be an electrical module or a repeater module. In some examples, the telecommunication system further includes a portal module operatively connected to the transmission line.

In some examples, the telecommunication system is a communication system for industrial environments involving linear or non-linear topology, which distributes power and backhauls data from network devices using a single coaxial cable. A non-linear network topology refers to a network topology where the network branches off to different nodes or network devices, for example, using the branch module described above.

In some examples, the telecommunication system or the modules described above may be used for network data communication. More specifically, network data communication in an industrial environment, where a linear network topology is involved.

In some examples, the telecommunication system allows network devices 110 to be deployed with access to high speed data communication and powered by locally conditioned (and optionally, protected) Power over Ethernet, using a single coaxial backbone cable 107 along the length of linear segments of such networks, with high speed performance at distances of up to 1 km to 2 km, or further.

In some examples, the use of coaxial cable allows the network to be repeatedly modified or extended with ease such as at branch points 111. A variety of node types (for example, Portal 103, Quadport 108, Branch 111 and Repeater 112) may be used to form the system, providing the building blocks to adapt to a variety of different industrial environments.

The modules described above, and their combination to form a telecommunication system, may provide several advantageous effects including:

1) Can enable significantly longer runs where power is not required.
2) Can provide power to Power over Ethernet Network Devices from the power running along the cable.
3) Provides localised conditioning (and optionally, protection) of power supplied to Network Devices attached at each node from the DC voltage available on the Backbone Cable.
4) Can be cut into and topology changed with simple tool requirements, being wire cutters, cable stripper, and a screwdriver.
5) The topology is not required to be linear in all aspects, as the Splitter device allows for branches, however the benefits of the invention are realised to the greatest extent within regions of the network topology that exhibit linear characteristics.
6) Provides intelligent Device nodes that can implement various discovery protocols.

Example 1: Example Components

The backbone cable 107 is implemented as a coaxial cable, which consists of an inner conductor surrounded by a tubular insulating layer, surrounded by a tubular conducting shield. One possible embodiment uses a solid outer shield, another possible embodiment uses a braided outer shield, while another possible embodiment has a shield that is designed to 'leak the signal' (also known as a leaky feeder cable). Another possible embodiment involves the use of a 'siamese' coaxial cable, which combines a coaxial cable with separate power carrying conductors all sealed into a single cable assembly.

The Data Packet Switch (DPS) 305 in its general form switches data packets to and from devices that are connected to its ports. One possible embodiment is a Layer 2 unmanaged Ethernet switch. A second possible embodiment is a Layer 2 managed Ethernet switch. A third possible embodiment is a Layer 2/3 Managed Ethernet switch.

The Data Packet Switch 305 may support energy conservation protocols when communicating with connected network devices. A possible embodiment of this energy conservation is the Green Ethernet IEEE802.3az EEE protocol.

The Data Packet Switch 305 may support redundant cabling protocols. One possible embodiment is Spanning Tree Protocol (STP). A second possible embodiment is RSTP (Rapid Spanning Tree Protocol). A third possible embodiment is MSTP (Multiple Spanning Tree Protocol). A fourth possible embodiment is ITU-T G.8032 Ethernet Ring Protection Switching (ERPS).

The Data Packet Switch 305 may support mechanisms for implementing Quality of Service (QoS) between different connected network devices 110 and different applications running on the network devices. A possible embodiment is Traffic classification QoS. A second possible embodiment is Class of Service (CoS). A third possible embodiment is bandwidth control for Ingress and Egress. A fourth possible embodiment is Storm Control. A fifth possible embodiment is DiffServ.

The Data Packet Switch 305 may support mechanisms for allocating network devices into separated Virtual Local Area Networks (VLAN). A possible embodiment is IEEE802.1q VLAN. A second possible embodiment is MAC based VLAN. A third possible embodiment is IP subnet based VLAN. A fourth possible embodiment is Protocol based VLAN. A fifth possible embodiment is Generic VLAN Registration Protocol (GVRP), a sixth possible embodiment is Multiple VLAN Registration Protocol (MVRP).

The Data Packet Switch 305 may support accurate time synchronisation to connected network devices 110. A possible embodiment is IEEE1588 PTP V2.

The Data Packet Switch 305 may support protocols for discovering details about connected network devices 110. One possible embodiment is Cisco Discovery Protocol (CDP). A second possible embodiment is IEEE802.1ab LLDP.

The Coaxial Communications Module (CCM) 203 in its general form converts data packets between Ethernet frames and a format suitable for transmission on the backbone cable 107, providing broadband data rates (up to hundreds of Mbps). A possible embodiment uses Multimedia over Coax Alliance (MoCA) 1.1 signaling on the backbone cable. Another possible embodiment uses Multimedia over Coax Alliance (MoCA) 2.0 signaling on the backbone cable. Another possible embodiment uses Multimedia over Coax Alliance (MoCA) 2.5 signaling on the backbone cable. Another possible embodiment uses HomePNA 2.0 signaling on the backbone cable. Another possible embodiment uses HomePNA 3.1 signaling on the backbone cable. Another possible embodiment uses G.hn signaling on the backbone cable. Another possible embodiment uses G.hnta signaling on the backbone cable. Another possible embodiment uses G.cx signaling on the backbone cable. Another possible embodiment uses Homeplug AV signaling on the backbone cable. Another possible embodiment uses Powerline AV500 signaling on the backbone cable.

The DC injector 204 in its general form combines Extra Low Voltage (ELV) power with the data communications signal from the Coaxial Communications Module (CCM) 203. One possible embodiment combines AC ELV power onto the backbone cable. A second possible embodiment combines DC ELV power onto the backbone cable using a bias tee.

The current limiter 201 in its general form ensures that a short circuit or over current event on the backbone cable 107 does not damage the electronics of devices in the system and stops an overheating or fire scenario from arising. A possible embodiment is a passive current limiter such as a varistor that self resets after the fault has been removed from the backbone cable. A second possible embodiment is an active current limiter comprised of electronics and transistors that monitor the current, which can self reset after the fault has been removed from the backbone cable. A third possible embodiment is a fuse that requires manual replacement after a trip event occurs. A fourth possible embodiment is a circuit breaker that must be manually reset after a trip event occurs.

The Power Conditioning and Conversion module 202 in its general form buffers the raw power from the backbone cable and creates a set of power supplies at controlled voltage levels, which are used to power the modules inside the Portal, Quadport and Repeater as well as generating the power supply used by the connected network devices 110. A possible implementation for each target power supply is a non-isolated DC-DC converter. A second possible implementation for each target power supply is an isolated DC-DC converter. A third possible implementation for each target power supply is a non-isolated AC-DC converter. A fourth possible implementation for each target power supply is an isolated AC-DC converter.

Each Power over Ethernet Injector (PI) 306 in its general form combines DC power delivery with Ethernet data communication on the Ethernet cable 105 that connects to each network device 110. A possible implementation is an IEEE 802.3af Mode A PoE injector. Another possible implementation is an IEEE 802.3af Mode B PoE injector. Another possible implementation is an IEEE 802.3at Mode A PoE injector. Another possible implementation is an IEEE 802.3at Mode B PoE injector. Another possible implementation is 4 Pairs (60 W/72 W) PD handshake mode PoE injection.

The splitter 303 in its general form divides the power and data signal on an incoming backbone cable into two outgoing power and data signals. A possible implementation is a resistive power splitter. Another possible implementation is a hybrid power splitter. Another possible implementation is a tee junction. Another possible implementation is a directional coupler. Another possible implementation is a Wilkinson power divider. Another possible implementation is a hybrid transformer.

The management module 205 can be used to monitor of the status of each node in the communications system. The monitored elements may include any one or more of the following: backbone cable voltage, device current consumption, over-current fault state, link state and data rate of each coaxial data port, link state and data rate of each connected network device 110 and current being delivered to each network device.

A possible embodiment of the monitoring functionality provides local feedback to a person adjacent to the device by means of visual or audible signals. A second possible embodiment provides a variation in colour or sound to indicate variations in the level of the measured quantity (for example, multiple coloured lights on the device to indicate different levels of available voltage). A third possible embodiment of the monitoring functionality provides remote feedback to a system administrator by communicating the monitoring status over the network.

The management module 205 can be used to configure the settings of each node in the communications system. The configurable elements can include: enabled ports on the Data Packet Switch (DPS) 305, redundant cabling protocol settings on the DPS, Quality of Service (QoS) settings on the DPS, Virtual Local Area Network (VLAN) settings on the DPS, time synchronisation settings on the DPS, discovery protocol settings on the DPS, power delivery settings for each Power over Ethernet Injector (PI) 306, time of day restrictions for power delivery on each PI.

A possible embodiment of the configuration functionality provides local controls that a technician can use when they are at the device. These controls may include push buttons, switches and rotary dials. Another possible embodiment of the configuration functionality provides the ability for a system administrator to remotely configure the device over the network.

The management module 205 can be used to enable discovery of each device in the communications system over the network even if its address is not known. A possible embodiment of this functionality exchanges layer 2 Ethernet broadcast frames between a management software program and each device. Another possible embodiment of this functionality exchanges layer 2 Ethernet multicast frames between a management software program and each device. Another possible embodiment of this functionality sends layer 2 Ethernet broadcast or multicast frames from a management software program and devices respond with layer 2 unicast Ethernet frames.

The management module 205 can be used to enable remote mapping of the topology of devices in the communications system. One possible embodiment of this functionality exchanges IEEE 802.3ab Link Layer Discovery Protocol (LLDP) frames between adjacent nodes to build a map of the device connectivity, with the neighbour information communicated back to a management software program. Another possible embodiment exchanges Cisco Discovery Protocol (CDP) frames between adjacent nodes to build a map of the device connectivity, with the neighbour information communicated back to a management software program.

The System involves the use of any two or more Devices selected from Portal, Quadport, or Repeater, optionally in conjunction with zero or more Branch Devices.

The system may involve a completely linear topology where power is applied at one or both ends.

The system may involve a partially linear topology, where there are linear segments of the network that are joined using the Branch Devices, or where linear segments of the network are joined using Portal, Quadport, or Repeaters connected to an external network device that facilitates communication between different network segments (for example without limitation, an Ethernet Switch).

The system may include aspects of a star topology, where at star junctions Portal, Quadport, or Repeaters are connected to an external network device that facilitates communication between the aforementioned Portal, Quadport, or Repeaters (for example without limitation, an Ethernet Switch).

The management processor 205 may optionally be additionally directly accessible via an Ethernet connection locally at the device itself.

The management processor 205 may optionally be additionally directly accessible via a USB connection locally at the device itself.

The management processor 205 within any of the Devices may optionally contain local storage (for example, flash memory or removable flash memory card) for the purpose of storing applications or data relevant to the configuration, control, management or monitoring of either that Device and/or the System.

The management processor may optionally allow for the local device configuration (including the configuration of the other internal elements of the Device that the management processor manages) to be uploaded and downloaded via the USB, Ethernet, or Flash Memory interfaces. This facility provides for rapid replacement of a given device with an equivalently configured device in the event of failure. One particular embodiment may be to remove a Flash memory card that contains the device configuration from the failed Device and insert it into the replacement Device, to immediately have the replacement Device configured in the same way as the original device.

The number of Ethernet ports on any of the devices with Ethernet connectivity may be zero or more, and the number of these Ethernet ports which are further furnished with Power over Ethernet capabilities may be zero or more, and need not be all of the available Ethernet Ports. For example, varying embodiments of the Quadport device may have 1, 2, 3, 4, 5, or even more available external Ethernet ports, some/all/none of which may have Power over Ethernet capability.

The Power Conditioning and Current Limiting functionality within each device may be optional.

Example 2: Examples of Industrial Applicability

By way of example and without limitation, the system is applicable for use in industrial applications such as those described below.

In mining environments. For example, in a mine which has a spiral decline providing access to the underground levels, with multiple horizontal levels splitting off from the spiral decline at varying depths. The spiral decline may be furnished with, and each horizontal level can extend up to 1 km from the spiral decline before any additional power insertion is required. As the tunnels in each horizontal level are extended (through drilling and extraction of rock) the system described herein may be extended as required using the simple tooling that is readily available to technicians in an underground mining environment.

In road tunnels. The system is applicable in road tunnel applications, which would commonly involve a primarily linear topology. In this case tunnels up to 2 km in length would not require any power distribution within the tunnel for communication purposes, as the system described herein could be powered from either end of the tunnel. Longer tunnels are catered for with minimal requirement for termination of power within the tunnel, as power would only need to be supplied at approximately 1 km intervals (as opposed to, for example, every 100 m if daisy-chained Ethernet was used).

Along overland conveyors. The system is applicable for deploying along overland conveyors, which require remote video surveillance and monitoring of the status of material on the conveyor.

Along long processing plant lines. The system is applicable for deploying alongside long processing lines such as concentrators and refineries, where video surveillance, RFID tracking, data acquisition and control of machines along the processing line are required to control the process effectively.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The invention claimed is:

1. A telecommunication system including:
a first transmission line adapted to transport data and power;
a plurality of network devices operatively attached to the first transmission line via three or more modules, wherein the modules include the following:
a) an electrical module adapted to operatively connect to the first transmission line, the electrical module including:
a first connection point adapted to connect to a network device of the plurality of network devices;
wherein the electrical module:
receives a composite signal from the first transmission line, the composite signal including a data component and a power component;
separates the composite signal to extract the data component and the power component;
transmits the data component to the network device through the first connection point; and
supplies the power component to the network device through the first connection point;
wherein the electrical module further:
receives an output data from the network device through the first connection point;
converts a format of the output data; and
transmits the converted output data along the first transmission line; and,
(b) a repeater module, adapted to operatively connect to the first transmission line, the repeater module including:
a second connection point adapted to connect to a network device of the plurality of network devices;
wherein the repeater module:
receives the composite signal from the first transmission line;
receives a second signal from the first transmission line or from a second transmission line, the second signal including a second power component;
separates the composite signal to extract the data component;
separates the composite signal to extract the second power component;
decodes the data component and recreates the data component to form a recreated data component; and
transmits the recreated data component along the second transmission line; and
c) a third module, adapted to operatively connect to the first transmission line, the third module including:
a third connection point adapted to connect to a network device of the plurality of network devices;
wherein the third module:
receives the composite signal from the first transmission line;
separates the composite signal to extract the data component and the power component;
transmits the data component through the third connection point; and
supplies the power component through the third connection point;
wherein the third module further:
receives a second composite signal from the first transmission line, the second composite signal including the converted output data;
separates the second composite signal to extract the converted output data; and
transmits data through the third connection point, wherein the data is derived from the converted output data.

2. The telecommunication system of claim 1, wherein the telecommunication system further includes a portal module operatively connected to the first transmission line wherein the portal module includes:
a power input port receiving an input power; and
a data port receiving input data;

wherein the portal node:
  combines the input power and the input data to generate the composite signal; and
  transmits the composite signal along the first transmission line.

3. The telecommunication system of claim 1, wherein the repeater module further:
  combines a portion of the power component and the recreated data component to generate a recreated composite signal; and
  transmits the recreated composite signal along the second transmission line.

* * * * *